US012809586B2

(12) United States Patent
Lee

(10) Patent No.: US 12,809,586 B2
(45) Date of Patent: Nov. 24, 2026

(54) MAC OPERATOR RELATED TO CIRCUIT AREA

(71) Applicant: SK hynix Inc., Icheon-si (KR)

(72) Inventor: Seong Ju Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 917 days.

(21) Appl. No.: 18/188,382

(22) Filed: Mar. 22, 2023

(65) Prior Publication Data

US 2024/0028299 A1 Jan. 25, 2024

(30) Foreign Application Priority Data

Jul. 25, 2022 (KR) ........................ 10-2022-0091853

(51) Int. Cl.
*G06F 7/544* (2006.01)
*G06F 7/49* (2006.01)
*G06F 7/72* (2006.01)

(52) U.S. Cl.
CPC .............. *G06F 7/5443* (2013.01); *G06F 7/49* (2013.01); *G06F 7/729* (2013.01)

(58) Field of Classification Search
CPC .... G06F 7/49; G06F 7/5443; G06F 7/72–722; G06F 7/727; G06F 7/729
See application file for complete search history.

(56) References Cited

U.S. PATENT DOCUMENTS 4,910,699 A * 3/1990 Capps .................... G06E 1/065
708/191
5,117,383 A 5/1992 Fujita et al.
2013/0311532 A1* 11/2013 Olsen ...................... G06F 7/729
708/491
2015/0106414 A1* 4/2015 Olsen ...................... H03M 7/18
708/204
2020/0310761 A1* 10/2020 Rossi ...................... H03M 7/18
(Continued)

OTHER PUBLICATIONS

Dhanabal, R., V. Barathi, and R. Samhitha Naamatheertham. "Implementation of floating point MAC using residue No. system." 2014 International Conference on Reliability Optimization and Information Technology (ICROIT). IEEE, 2014. (Year: 2014).*

*Primary Examiner* — Matthew D Sandifer
(74) *Attorney, Agent, or Firm* — WILLIAM PARK AND ASSOCIATES LTD.

(57) ABSTRACT

A multiplication and accumulation (MAC) operator includes a residue number generating circuit configured to generate a plurality of weight residue number data for weight data and a plurality of vector residue number data for the vector data by using a plurality of divisors, a multiplication circuit configured to generate a plurality of residue number multiplication data by performing a multiplication operation on the weight residue number data and the vector residue number data, an addition circuit configured to generate residue number multiplication addition data by performing an addition operation on the multiplication data, an accumulating circuit configured to generate residue number accumulation data by performing an accumulation operation on the residue number multiplication addition data and latch data, and a mixed radix conversion circuit configured to generate the MAC result data by using the divisors and the residue number accumulation data that is transmitted by the accumulating circuit.

20 Claims, 14 Drawing Sheets

(56) References Cited

U.S. PATENT DOCUMENTS

| | | | | |
|---|---|---|---|---|
| 2021/0303267 | A1 | 9/2021 | Jiao et al. | |
| 2023/0144950 | A1* | 5/2023 | Park | G06N 3/048<br>712/221 |

* cited by examiner

MAC OPERATOR RELATED TO CIRCUIT AREA

CROSS-REFERENCE TO RELATED APPLICATION

The present application claims priority under 35 U.S.C. § 119(a) to Korean application number 10-2022-0091853, filed in the Korean Intellectual Property Office on Jul. 25, 2022, the entire disclosure of which is incorporated herein by reference.

BACKGROUND

1. Technical Field

Several embodiments of the present disclosure generally relate to a multiplication and accumulation (hereinafter referred to as "MAC") operator and, more particularly, to a MAC operator related to a circuit area of the MAC operator.

2. Related Art

Recently, an interest in artificial intelligence has suddenly increased in all industries including finance and healthcare, in addition to the information technology (IT) industry. Accordingly, in various fields, the introduction of artificial intelligence, more accurately, deep learning is taken into consideration, and deep learning is prototyped. In general, deep learning collectively refers to a technology for effectively training deep neural networks (DNNs) or deep networks having the number of layers increased from the number of layers of the existing neural networks and using the DNNs or deep networks in pattern recognition or inference.

One of backgrounds and causes of such a wide interest in deep learning may be to improve performance of a processor that performs operations. In order to improve performance of artificial intelligence, the layers of a neural network are stacked up to several hundreds of layers and trained. Such a trend has recently continued for several years. Accordingly, the amount of operations required for hardware that actually performs operations has increased geometrically. Furthermore, in the case of the existing hardware system in which a memory and a processor are separated from each other, the improvements of artificial intelligence hardware performance are hindered due to the limited amount of data communication between the memory and the processor. In order to solve such a problem, a processing in memory (PIM) device in which a processor and a memory are integrated in a semiconductor chip itself recently tends to be used as a neural network computing device. A neural network operation in the PIM device includes a matrix multiplication operation through an MAC operator. The MAC operator consists of many operation circuits, and has a high degree of integration. Accordingly, the MAC operator may be vulnerable to a voltage or temperature change. There is also a possibility that a failure attributable to a particle may occur in the MAC operator. As described above, an operation error may occur in the MAC operator due to various causes. The operation error causes an error in the training and inference results of deep learning.

SUMMARY

In an embodiment, an MAC operator may generate MAC result data by performing an MAC operation on first to "M"-th ("M" is a natural number) weight data and first to "M"-th vector data. The MAC operator may include a residue number generating circuit, a multiplication circuit, an addition circuit, an accumulating circuit, and a mixed radix conversion circuit. The residue number generating circuit may generate first to "M"-th weight residue number data for first to the "M"-th weight data and first to "M"-th vector residue number data for the first to "M"-th vector data by using first to "K"-th divisors ("K" is a natural number equal to or greater than 2). The multiplication circuit may generate first to "M"-th residue number multiplication data by performing a multiplication operation on the first to "M"-th weight residue number data and the first to "M"-th vector residue number data. The addition circuit may generate residue number multiplication addition data by performing an addition operation on the first to "M"-th residue number multiplication data. The accumulating circuit may generate residue number accumulation data by performing an accumulation operation on the residue number multiplication addition data and latch data. The mixed radix conversion circuit may generate the MAC result data by using the first to "K"-th divisors and the residue number accumulation data that is transmitted by the accumulating circuit to the mixed radix conversion circuit.

BRIEF DESCRIPTION OF THE DRAWINGS

Certain features of the disclosed technology are illustrated by various embodiments with reference to the attached drawings, in which.

DETAILED DESCRIPTION

In the following description of embodiments, it will be understood that the terms "first" and "second" are intended to identify elements, but not used to define a particular number or sequence of elements. In addition, when an element is referred to as being located "on," "over," "above," "under," or "beneath" another element, it is intended to mean relative positional relationship, but not used to limit certain cases for which the element directly contacts the other element, or at least one intervening element is present between the two elements. Accordingly, the terms such as "on," "over," "above," "under," "beneath," "below," and the like that are used herein are for the purpose of describing particular embodiments only and are not intended to limit the scope of the present disclosure. Further, when an element is referred to as being "connected" or "coupled" to another element, the element may be electrically or mechanically connected or coupled to the other element directly, or may be electrically or mechanically connected or coupled to the other element indirectly with one or more additional elements between the two elements. Moreover, when a parameter is referred to as being "predetermined," it may be intended to mean that a value of the parameter is determined in advance of when the parameter is used in a process or an algorithm. The value of the parameter may be set when the process or the algorithm starts or may be set during a period in which the process or the algorithm is executed. A logic "high" level and a logic "low" level may be used to describe logic levels of electric signals. A signal having a logic "high" level may be distinguished from a signal having a logic "low" level. For example, when a signal having a first voltage corresponds to a signal having a logic "high" level, a signal having a second voltage may correspond to a signal having a logic "low" level. In an embodiment, the logic "high" level may be set as a voltage level which is higher than a voltage level of the logic "low" level. Meanwhile, logic levels of signals may be set to be different or opposite according to embodiment. For example, a certain signal having a logic "high" level in one embodiment may be set to have a logic "low" level in another embodiment.

Various embodiments of the present disclosure will be described hereinafter in detail with reference to the accompanying drawings. However, the embodiments described herein are for illustrative purposes only and are not intended to limit the scope of the present disclosure.

Figure 1:
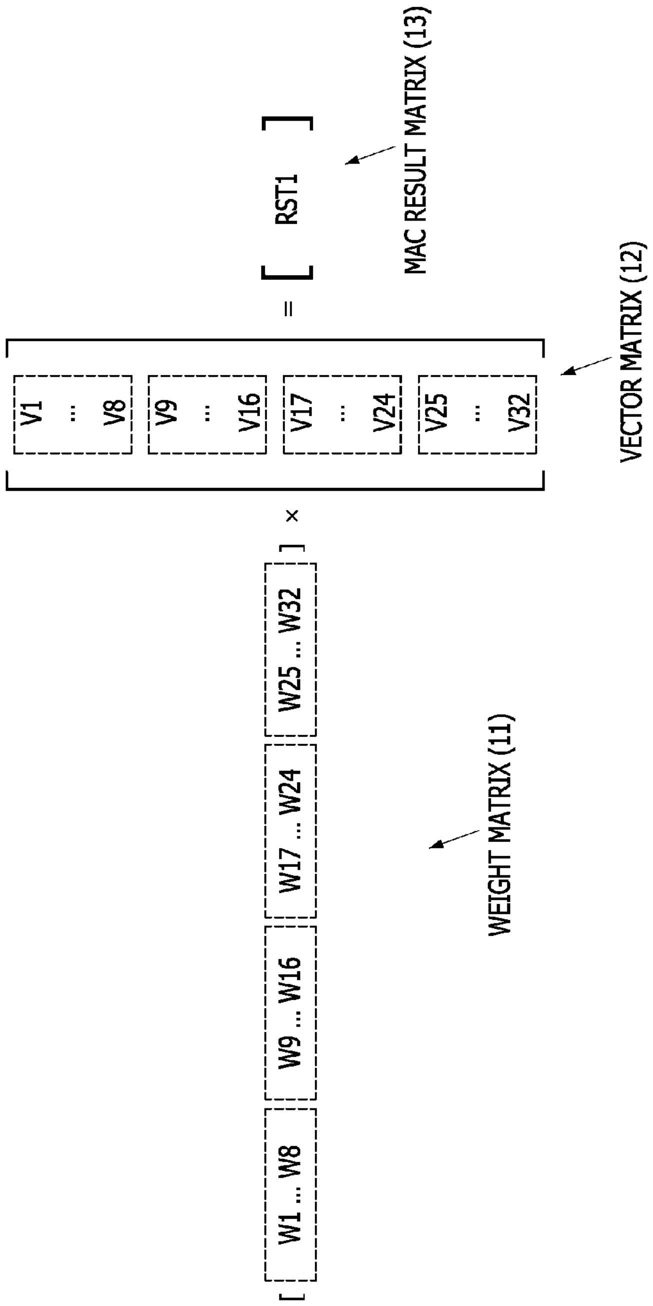
FIG. 1 is a diagram illustrated to describe matrix multiplication that is performed in an MAC operator according to an example of the present disclosure.

FIG. 1 is a diagram illustrated to describe matrix multiplication that is performed in an MAC operator according to an example of the present disclosure. Referring to FIG. 1, the MAC operator may perform matrix multiplication on a weight matrix 11 and a vector matrix 12, and may generate an MAC result matrix 13 as a result of the matrix multiplication. The weight matrix 11 may have a 1×32 matrix format that has weight data W1 to W32 as an element. The vector matrix 12 may have a 32×1 matrix format that has vector data V1 to V32 as an element. The MAC result matrix 13 may have a 1×1 matrix format that has MAC result data RST1 as an element. In the present example, the sizes of the weight matrix 11 and the vector matrix 12 are merely examples, and the sizes of the weight matrix 11 and the vector matrix 12 may be variously set on the premise that a column of the weight matrix 11 and a row of the vector matrix 12 are identical with each other. In one example, each of the first to thirty-second weight data W1 to W32 and the first to thirty-second vector data V1 to V32 may be data that is used in an operation of a multi-layer perceptron (MLP) neural network. In the following several examples, a case in which the first to thirty-second weight data W1 to W32 and the first to thirty-second vector data V1 to V32 have a signed fixed-point format is premised.

The matrix multiplication for the weight matrix 11 and the vector matrix 12 may be performed through a plurality of MAC operations depending on the operation capability of the MAC operator. In the following several examples, a case in which the MAC operator has been designed to be capable of performing an operation on eight weight data and vector data is premised. In this case, the MAC operator may output the MAC result data RST1 through first to fourth MAC operations. The first MAC operation may be performed as the first matrix multiplication for the first to eighth weight data W1 to W8 and the first to eighth vector data V1 to V8. As a result of the first MAC operation, first accumulation data, that is, the results of the first matrix multiplication, may be generated. The second MAC operation may be performed as second matrix multiplication and a first accumulation operation. The second matrix multiplication may be performed on the ninth to sixteenth weight data W9 to W16 and the ninth to sixteenth vector data V9 to V16. The first accumulation operation may be performed on second matrix multiplication result data and first accumulation data. As a result of the second MAC operation, second accumulation data may be generated. The third MAC operation may be performed as third matrix multiplication and a second accumulation operation. The third matrix multiplication may be performed on the seventeenth to twenty-fourth weight data W17 to W24 and the seventeenth to twenty-fourth vector data V17 to V24. The second accumulation operation may be performed on third matrix multiplication result data and second accumulation data. As a result of the third MAC operation, third accumulation data may be generated. The fourth MAC operation may be performed as fourth matrix multiplication and a third accumulation operation. The fourth matrix multiplication may be performed on the twenty-fifth to thirty-second weight data W25 to W32 and the twenty-fifth to thirty-second vector data V25 to V32. The third accumulation operation may be performed on fourth matrix multiplication result data and third accumulation data. Fourth accumulation data that is generated as a result of the fourth MAC operation may constitute the MAC result data RST1.

Figure 2:
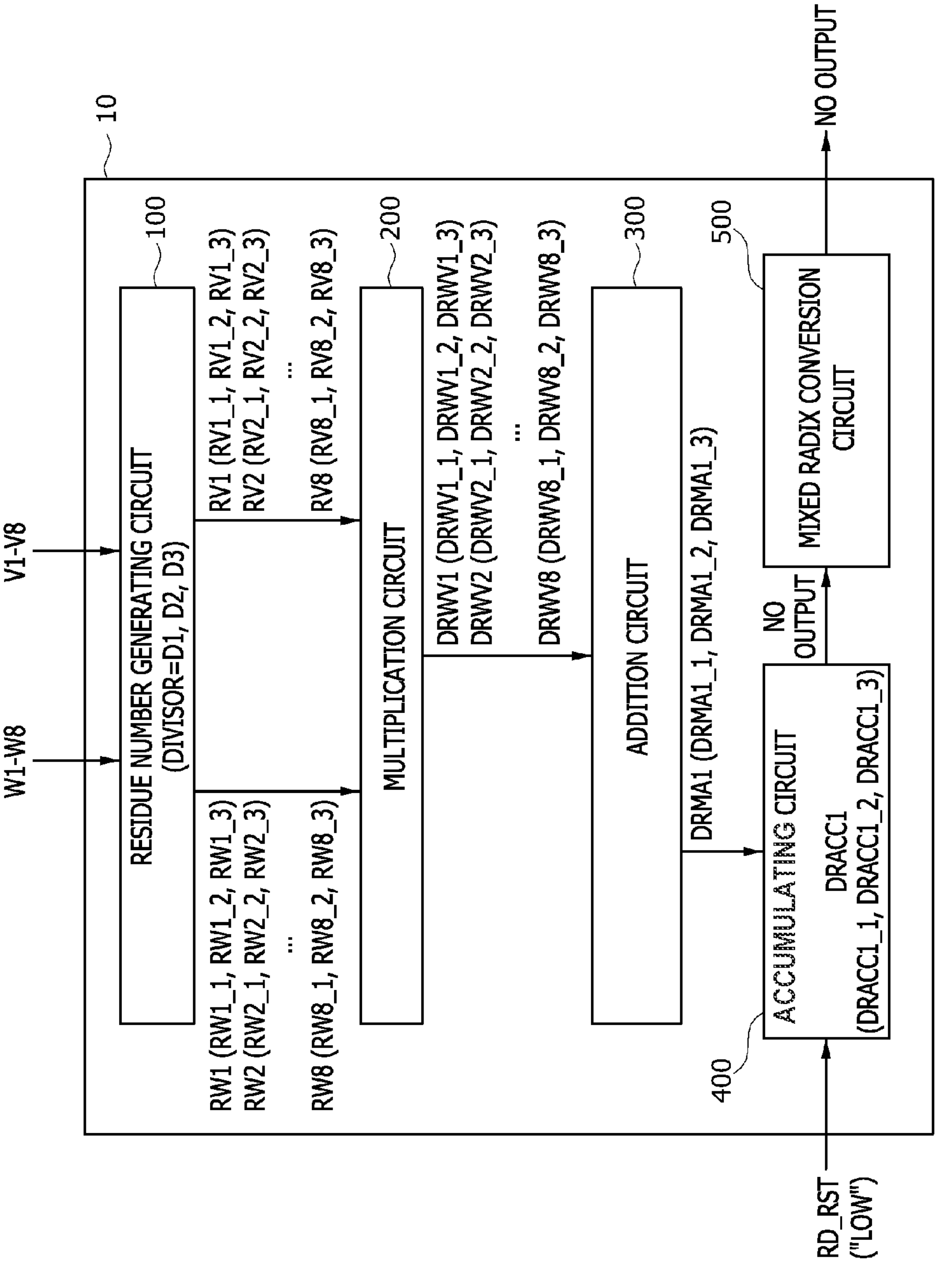
FIG. 2 is a block diagram illustrating an MAC operator according to an example of the present disclosure.
Figure 3:
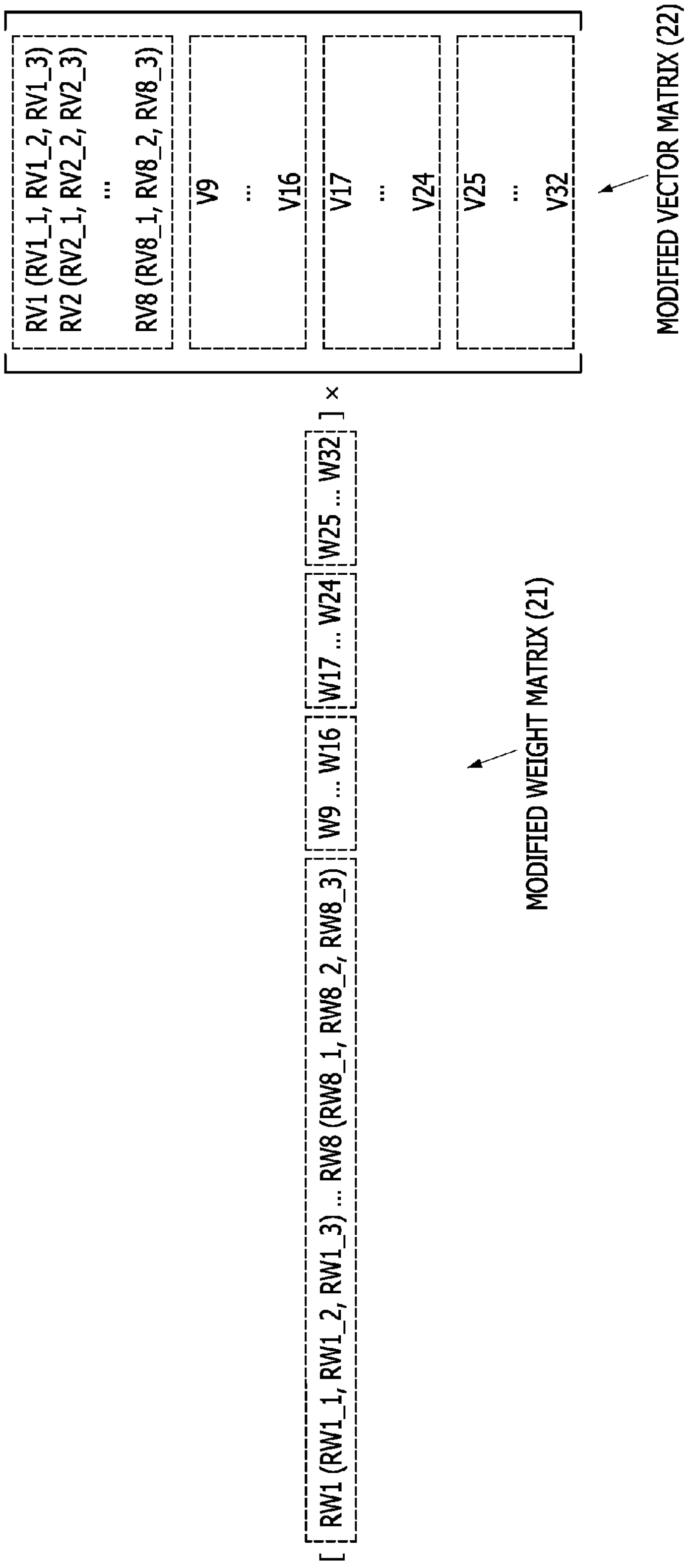
FIG. 3 is a diagram illustrating a weight matrix and vector matrix that have been changed by a residue number generating circuit that is included in the MAC operator of FIG. 2.

FIG. 2 is a block diagram illustrating an MAC operator 10 according to an example of the present disclosure. Furthermore, FIG. 3 is a diagram illustrating a weight matrix and vector matrix that have been changed by a residue number generating circuit 100 that is included in the MAC operator 10 of FIG. 2. The MAC operator 10 according to the present example may generate the MAC result matrix 13 by performing matrix multiplication on the weight matrix 11 and the vector matrix 12 that have been described with reference to FIG. 1. In this process, a multiplication operation, an addition operation, and an accumulation operation for an MAC operation might not be performed on the weight matrix 11 and vector matrix 12 of FIG. 1, and may be performed on a modified weight matrix 21 and modified vector matrix 22 of FIG. 3. FIG. 2 illustrates a first MAC operation process among the first to fourth MAC operations that have been described with reference to FIG. 1.

Referring to FIG. 2, the MAC operator 10 may receive first to eighth weight data W1 to W8 and first to eighth vector data V1 to V8. The MAC operator 10 may convert the first to eighth weight data W1 to W8 and the first to eighth vector data V1 to V8 into first to eighth weight residue number data RW1 to RW8 and first to eighth vector residue number data RV1 to RV8, respectively. Furthermore, the MAC operator may perform first matrix multiplication on the first to eighth weight residue number data RW1 to RW8 and the first to eighth vector residue number data RV1 to RV8. The MAC operator 10 may generate first residue number accumulation data DRACC1 as the results of the first matrix multiplication, but might not output MAC result data. The MAC operator 10 may include a residue number generating circuit 100, a multiplication circuit 200, an addition circuit 300, an accumulating circuit 400, and a mixed radix conversion (MRC) circuit 500. The MRC circuit 500 will be described with reference to FIG. 4.

The residue number generating circuit 100 may receive the first to eighth weight data W1 to W8 and the first to eighth vector data V1 to V8. The residue number generating circuit 100 may perform division operations of dividing the first to eighth weight data W1 to W8 and the first to eighth vector data V1 to V8 into "K" ("K" is a natural number equal to or greater than 2) divisors. Hereinafter, a case in which three (i.e., "K"=3) divisors D1, D2, and D3 have been set in the residue number generating circuit 100 is taken as an example. The following description may also be identically applied to a case in which the number of divisors is two or four or more. The residue number generating circuit 100 may output the first to eighth weight residue number data RW1, RW2 to RW8 that are generated by division operations of dividing each of the first to eighth weight data W1 to W8 by the divisors D1, D2, and D3. Furthermore, the residue number generating circuit 100 may output the first to eighth vector residue number data RV1, RV2 to RV8 that are generated by division operations of dividing each of the first to eighth vector data V1 to V8 by the divisors D1, D2, and D3.

Specifically, the residue number generating circuit 100 may perform division operations of dividing the first weight data W1 by the divisors D1, D2, and D3. The residue number generating circuit 100 may output first to third residue numbers RW1_1, RW1_2, and RW1_3 of the division operations as the first weight residue number data RW1. The first residue number RW1_1 of the first weight residue number data RW1 may correspond to a residue number of a division operation of dividing the first weight data W1 by the first divisor D1. The second residue number RW1_2 of the first weight residue number data RW1 may correspond to a residue number of a division operation of dividing the first weight data W1 by the second divisor D2. The third residue number RW1_3 of the first weight residue number data RW1 may correspond to a residue number of a division operation of dividing the first weight data W1 by the third divisor D3.

The residue number generating circuit 100 may perform division operations of dividing the second weight data W2 by the divisors D1, D2, and D3. The residue number generating circuit 100 may output first to third residue numbers RW2_1, RW2_2, and RW2_3 of the division operations as the second weight residue number data RW2. The first residue number RW2_1 of the second weight residue number data RW2 may correspond to a residue number of a division operation of dividing the second weight data W2 by the first divisor D1. The second residue number RW2_2 of the second weight residue number data RW2 may correspond to a residue number of a division operation of dividing the second weight data W2 by the second divisor D2. The third residue number RW2_3 of the second weight residue number data RW2 may correspond to a residue number of a division operation of dividing the second weight data W2 by the third divisor D3.

Likewise, the residue number generating circuit 100 may perform division operations of dividing the eighth weight data W8 by the divisors D1, D2, and D3, and may output residue numbers of the division operations RW8_1, RW8_2, and RW8_3 as the eighth weight residue number data RW8. The first residue number RW8_1 of the eighth weight residue number data RW8 may correspond to a residue number of a division operation of dividing the eighth weight data W8 by the first divisor D1. The second residue number RW8_2 of the eighth weight residue number data RW8 may correspond to a residue number of a division operation of dividing the eighth weight data W8 by the second divisor D2. The third residue number RW8_3 of the eighth weight residue number data RW8 may correspond to a residue number of a division operation of dividing the eighth weight data W8 by the third divisor D3. In the same way, the residue number generating circuit may generate and output third to seventh weight residue number data for third to seventh weight data, respectively.

The residue number generating circuit 100 may perform division operations of dividing the first vector data V1 by the divisors D1, D2, and D3. The residue number generating circuit 100 may output first to third residue numbers RV1_1, RV1_2, and RV1_3 of the division operations as the first vector residue number data RV1. The first residue number RV1_1 of the first vector residue number data RV1 may correspond to a residue number of a division operation of dividing the first vector data V1 by the first divisor D1. The second residue number RV1_2 of the first vector residue number data RV1 may correspond to a residue number of a division operation of dividing the first vector data V1 by the second divisor D2. The third residue number RV1_3 of the first vector residue number data RV1 may correspond to a residue number of a division operation of dividing the first vector data V1 by the third divisor D3.

The residue number generating circuit 100 may perform division operations of dividing the second vector data V2 by the divisors D1, D2, and D3. The residue number generating circuit 100 may output the first to third residue numbers RV2_1, RV2_2, and RV2_3 of the division operations as the second vector residue number data RV2. The first residue number RV2_1 of the second vector residue number data RV2 may correspond to a residue number of a division operation of dividing the second vector data V2 by the first divisor D1. The second residue number RV2_2 of the second vector residue number data RV2 may correspond to a residue number of a division operation of dividing the second vector data V2 by the second divisor D2. The third residue number RV2_3 of the second vector residue number data RV2 may correspond to a residue number of a division operation of dividing the second vector data V2 by the third divisor D3.

Likewise, the residue number generating circuit 100 may perform division operations of dividing the eighth vector data V8 by the divisors D1, D2, and D3, and may output residue numbers RV8_1, RV8_2, and RV8_3 of the division operations as the eighth vector residue number data RV8. The first residue number RV8_1 of the eighth vector residue number data RV8 may correspond to a residue number of a division operation of dividing the eighth vector data V8 by the first divisor D1. The second residue number RV8_2 of the eighth vector residue number data RV8 may correspond to a residue number of a division operation of dividing the eighth vector data V8 by the second divisor D2. The third residue number RV8_3 of the eighth vector residue number data RV8 may correspond to a residue number of a division operation of dividing the eighth vector data V8 by the third divisor D3. In the same way, the residue number generating circuit 100 may generate and output third to seventh vector residue number data for third to seventh vector data, respectively.

The first, second, and third divisors D1, D2, and D3 that are used in the division operations in the residue number generating circuit 100 may be set as positive integers that satisfy all of the following two conditions. The first condition is a condition in which all of the first, second, and third divisors D1, D2, and D3 are prime numbers and have relatively prime relations. The second condition is a condition in which a value obtained by multiplying all of the first, second, and third divisors D1, D2, and D3 is greater than a maximum value of each of the weight data W1 to W8 and each of the vector data V1 to V8, which are used as dividends. If such conditions are satisfied, the first to third residue numbers of each of the weight data W1 to W8, the first, second, and third divisors D1, D2, and D3, and each of the weight data W1 to W8 may constitute a simultaneous congruence equation. Specifically, the first to third residue numbers RW1_1, RW1_2, and RW1_3 of the first weight data W1, the first, second, and third divisors D1, D2, and D3, and the first weight data W1 may constitute simultaneous congruence equations of Equation (1) to Equation (3).

$$W1 \equiv RW1\_1 (\text{mod } D1) \quad \text{Equation (1)}$$

$$W1 \equiv RW1\_2 (\text{mod } D2) \quad \text{Equation (2)}$$

$$W1 \equiv RW1\_3 (\text{mod } D3) \quad \text{Equation (3)}$$

Likewise, the first to third residue numbers RV1_1, RV1_2, and RV1_3 of the first vector data V1, the first, second, and third divisors D1, D2, and D3, and the first vector data V1 may constitute simultaneous congruence equations of Equation (4) to Equation (6).

$$V1 \equiv RV1\_1 (\text{mod } D1) \quad \text{Equation (4)}$$

$$V1 \equiv RV1\_2 (\text{mod } D2) \quad \text{Equation (5)}$$

$$V1 \equiv RV1\_3 (\text{mod } D3) \quad \text{Equation (6)}$$

In Equation (1) to Equation (6), "≡" may indicate congruence, and "mod" may indicate an operator of a modular operation.

As illustrated in FIG. 3, the weight matrix 11 and the vector matrix 12 in FIG. 1 are converted into a modified weight matrix 21 and a modified vector matrix 22, respectively, by the residue number generating circuit 100. Specifically, the first to eighth weight data W1 to W8 of the weight matrix 11 are changed into the first to eighth weight residue number data RW1 to RW8 of the modified weight matrix 21. The first weight residue number data RW1 may include sub-elements of the first to third residue numbers RW1_1, RW1_2, and RW1_3. The eighth weight residue number data RW8 may include sub-elements of the first to third residue numbers RW8_1, RW8_2, and RW8_3. The first to eighth vector data V1 to V8 of the vector matrix 12 are changed into the first to eighth vector residue number data RV1 to RV8 of the modified vector matrix 22. The first vector residue number data RW1 may include sub-elements of the first to third residue numbers RV1_1, RV1_2, and RV1_3. The eighth vector residue number data RV8 may include sub-elements of the first to third residue numbers RV8_1, RV8_2, and RV8_3.

Referring back to FIG. 2, the residue number generating circuit 100 may transmit the first to eighth weight residue number data RW1 to RW8 and the first to eighth vector residue number data RV1 to RV8 to the multiplication circuit 200. The multiplication circuit 200 may perform first matrix multiplication on the first to eighth weight residue number data RW1 to RW8 and the first to eighth vector residue number data RV1 to RV8. The multiplication circuit 200 may generate first to eighth residue number multiplication data DRWV1, RRWV2 to DRWV8, that is, the results of the first matrix multiplication. Multiplication operations in the multiplication circuit 200 may be performed on residue numbers of division operations by the same divisor among the first, second, and third divisors D1, D2, and D3 that are used in the residue number generating circuit 100.

Specifically, the multiplication operations in the multiplication circuit 200 may be performed by being divided into first multiplication operations, second multiplication operations, and third multiplication operations. The first multiplication operations may be performed on residue numbers of division operations by the first divisor D1, that is, the first residue numbers RW1_1 to RW8_1 of the first to eighth weight residue number data RW1 to RW8 and the first residue numbers RV1_1 to RV8_1 of the first to eighth vector residue number data RV1 to RV8. The second multiplication operations may be performed on residue numbers of division operations by the second divisor D2, that is, the second residue numbers RW1_2 to RW8_2 of the first to eighth weight residue number data RW1 to RW8 and the second residue numbers RV1_2 to RV8_2 of the first to eighth vector residue number data RV1 to RV8. The third multiplication operations may be performed on residue numbers of the division operations by the third divisor D3, that is, the third residue numbers RW1_3 to RW8_3 of the first to eighth weight residue number data RW1 to RW8 and the third residue numbers RV1_3 to RV8_3 of the first to eighth vector residue number data RV1 to RV8.

The first residue number multiplication data DRWV1 that is generated by the multiplication circuit 200 may include first to third sub-residue number multiplication data DRWV1_1, DRWV1_2, and DRWV1_3. The first sub-residue number multiplication data DRWV1_1 of the first residue number multiplication data DRWV1 may be multiplication results (i.e., "RW1_1×RV1_1") of the first residue number RW1_1 of the first weight residue number data RW1 and the first residue number RV1_1 of the first vector residue number data RV1. The second sub-residue number multiplication data DRWV1_2 of the first residue number multiplication data DRWV1 may be multiplication results (i.e., "RW1_2×RV1_2") of the second residue number RW1_2 of the first weight residue number data RW1 and the second residue number RV1_2 of the first vector residue number data RV1. The third sub-residue number multiplication data DRWV1_3 of the first residue number multiplication data DRWV1 may be multiplication results (i.e., "RW1_3×RV1_3") of the third residue number RW1_3 of the first weight residue number data RW1 and the third residue number RV1_3 of the first vector residue number data RV1.

The second residue number multiplication data DRWV2 that is generated by the multiplication circuit 200 may include first to third sub-residue number multiplication data DRWV2_1, DRWV2_2, and DRWV2_3. The first sub-residue number multiplication data DRWV2_1 of the second residue number multiplication data DRWV2 may be multiplication results (i.e., "RW2_1×RV2_1") of the first residue number RW2_1 of the second weight residue number data RW2 and the second residue number RV2_2 of the second vector residue number data RV2. The second sub-residue number multiplication data DRWV2_2 of the second residue number multiplication data DRWV2 may be multiplication results (i.e., "RW2_2×RV2_2") of the second residue number RW2_2 of the second weight residue number data RW2 and the second residue number RV2_2 of the second vector residue number data RV2. Furthermore, the third sub-residue number multiplication data DRWV2_3 of the second residue number multiplication data DRWV2 may be multiplication results (i.e., "RW2_3×RV2_3") of the third residue number RW2_3 of the second weight residue number data RW2 and the third residue number RV2_3 of the second vector residue number data RV2.

The eighth residue number multiplication data DRWV8 that is generated by the multiplication circuit 200 may include first to third sub-residue number multiplication data DRWV8_1, DRWV8_2, DRWV8_3. The first sub-residue number multiplication data DRWV8_1 of the eighth residue number multiplication data DRWV8 may be multiplication results (i.e., "RW8_1×RV8_1") of the first residue number RW8_1 of the eighth weight residue number data RW8 and the eighth residue number RV8_2 of the eighth vector residue number data RV8. The second sub-residue number multiplication data DRWV8_2 of the eighth residue number multiplication data DRWV8 may be multiplication results (i.e., "RW8_2×RV8_2") of the second residue number RW8_2 of the eighth weight residue number data RW8 and the second residue number RV8_2 of the eighth vector residue number data RV8. Furthermore, the third sub-residue number multiplication data DRWV8_3 of the eighth residue number multiplication data DRWV8 may be multiplication results (i.e., "RW8_3×RV8_3") of the third residue number RW8_3 of the eighth weight residue number data RW8 and the third residue number RV8_3 of the eighth vector residue number data RV8. The multiplication circuit 200 may transmit the first to eighth residue number multiplication data DRWV1 to DRWV8 to the addition circuit 300.

The addition circuit 300 may generate first residue number multiplication addition data DRMA1 by performing addition operations on the first to eighth residue number multiplication data DRWV1 to DRWV8. The addition operations in the addition circuit 300 may be performed as first to third addition operations that are performed on the first to third sub-residue number multiplication data, respectively.

Specifically, the first addition operation may be performed on the first sub-residue number multiplication data DRWV1_1, DRWV2_1 to DRWV8_1. As a result of the first addition operation, first sub-residue number multiplication addition data DRMA1_1 of the first residue number multiplication addition data DRMA1 may be generated. The second addition operation may be performed on the second sub-residue number multiplication data DRWV1_2, DRWV2_2 to DRWV8_2. As a result of the second addition operation, second sub-residue number multiplication addition data DRMA1_2 of the first residue number multiplication addition data DRMA1 may be generated. Furthermore, the third addition operation may be performed on the third sub-residue number multiplication data DRWV1_3, DRWV2_3 to DRWV8_3. As a result of the third addition operation, third sub-residue number multiplication addition data DRMA1_3 of the first residue number multiplication addition data DRMA1 may be generated. The addition circuit 300 may transmit the first residue number multiplication addition data DRMA1 to the accumulating circuit 400.

The accumulating circuit 400 may generate the first residue number accumulation data DRACC1 by performing an accumulation operation on the first residue number multiplication addition data DRMA1. The accumulation operation in the accumulating circuit 400 may be performed by adding data that has been transmitted by the addition circuit 300 and latch data that has been latched in the accumulating circuit 400. The latch data may be the same as accumulation data that is generated by the accumulating circuit 400 in a previous MAC operation process. Because a first MAC operation is the first MAC operation (i.e., because a previous MAC operation is not present), the latch data that is added to the first residue number multiplication addition data DRMA1 becomes "0", that is, a reset value. Accordingly, the first residue number accumulation data DRACC1 that is generated in a first accumulation operation of the accumulating circuit 400 is the same as the first residue number multiplication addition data DRMA1. Accordingly, the first residue number accumulation data DRACC1 may include first sub-residue number accumulation data DRACC1_1 that is identical with the first sub-residue number multiplication addition data DRMA1_1, second sub-residue number accumulation data DRACC1_2 that is identical with the second sub-residue number multiplication addition data DRMA1_2, and third sub-residue number accumulation data DRACC1_3 that is identical with the third sub-residue number multiplication addition data DRMA1_3.

The first residue number accumulation data DRACC1 that is generated by the accumulating circuit 400 may be output from the accumulating circuit 400 or might not be output based on a logic level of an MAC result read signal RD_RST. For example, when the MAC result read signal RD_RST having a logic low level is transmitted to the accumulating circuit 400, the accumulating circuit 400 might not output the first residue number accumulation data DRACC1. In contrast, when the MAC result read signal RD_RST having a logic high level is transmitted to the accumulating circuit 400, the accumulating circuit 400 may output the first residue number accumulation data DRACC1. In the case of the present example, because the first MAC operation has been merely completed, the MAC result read signal RD_RST having a logic low level LOW may be transmitted to the accumulating circuit 400. Accordingly, the accumulating circuit 400 might not output the first residue number accumulation data DRACC1. The first residue number accumulation data DRACC1 generated by the accumulating circuit 400 may be used as latch data in a next MAC operation, that is, an accumulation operation of a second MAC operation.

Figure 4:
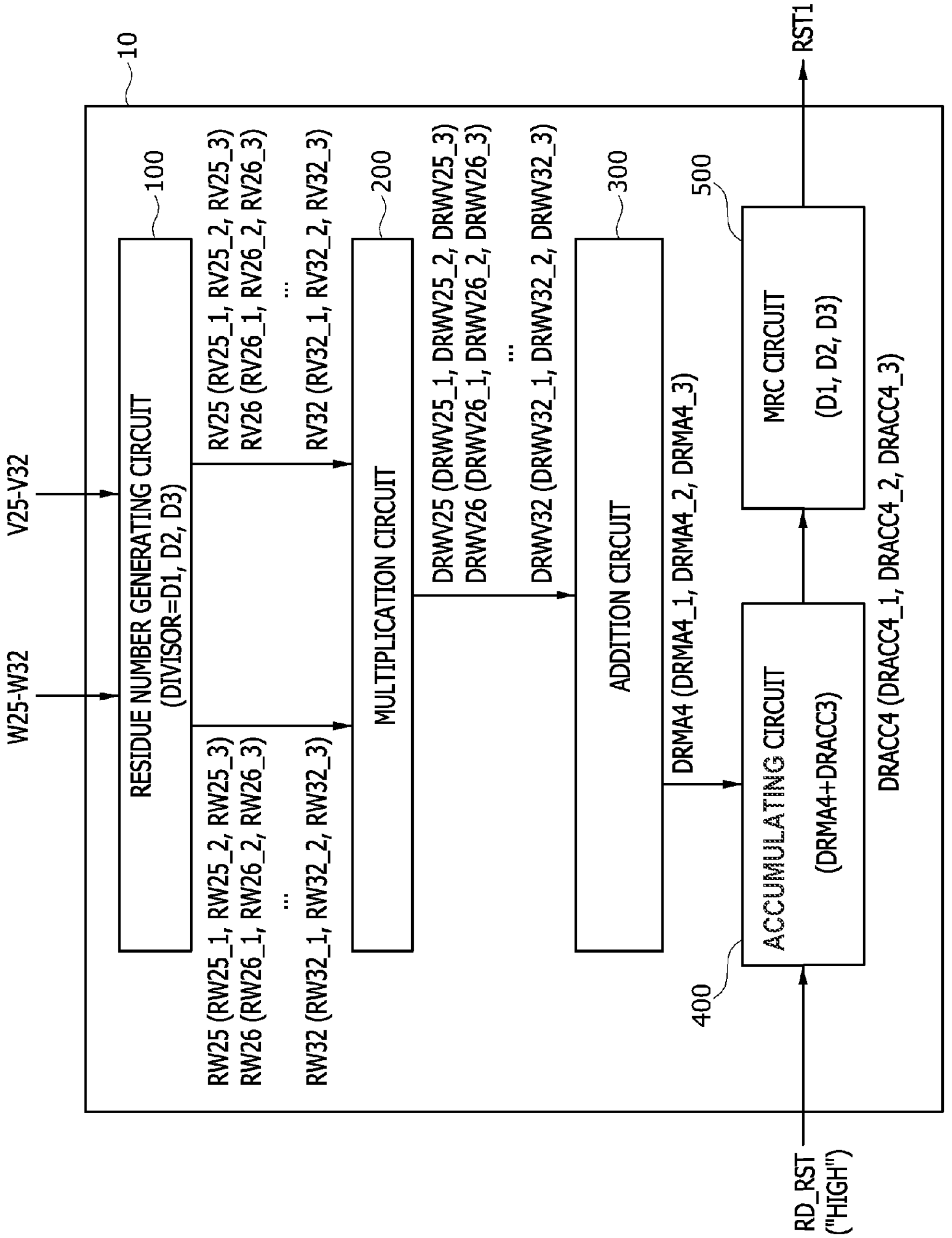
FIG. 4 is a diagram illustrated to describe a process of generating, by the MAC operator of FIG. 2, MAC result data, that is, the results of the matrix multiplication in FIG. 1.

FIG. 4 is a diagram illustrated to describe a process of generating, by the MAC operator 10 of FIG. 2, the MAC result data RST1, that is, the results of the matrix multiplication in FIG. 1. In FIG. 4, the same reference numeral as that in FIG. 2 may indicate the same component. FIG. 4 proposes a process of performing the fourth MAC operation among the first to fourth MAC operations that have been described with reference to FIG. 1. Hereinafter, it is assumed that the second MAC operation and the third MAC operation have been performed in the same way as the first MAC operation that has been described with reference to FIG. 2. Accordingly, third residue number accumulation data DRACC3 that is generated by the accumulating circuit 400 in a third MAC operation process is used as latch data in the fourth MAC operation. The third residue number accumulation data DRACC3 may include first sub-residue number accumulation data DRACC3_3, second sub-residue number accumulation data DRACC3_3, and third sub-residue number accumulation data DRACC3_3.

Referring to FIG. 4, the residue number generating circuit 100 may receive twenty-fifth to thirty-second weight data W25 to W32 and twenty-fifth to thirty-second vector data V25 to V32. The residue number generating circuit 100 may output the twenty-fifth to thirty-second weight residue number data RW25, RW26 to RW32 that are generated by division operations of dividing the twenty-fifth to thirty-second weight data W25 to W32 by the divisors D1, D2, and D3. The twenty-fifth weight residue number data RW25 may include first to third residue numbers RW25_1, RW25_2, and RW25_3. The twenty-sixth weight residue number data RW26 may include first to third residue numbers RW26_1, RW26_2, and RW26_3. The thirty-second weight residue number data RW32 may include first to third residue numbers RW32_1, RW32_2, and RW32_3. Furthermore, the residue number generating circuit 100 may output twenty-fifth to thirty-second vector residue number data RV25, RV26 to RV32 that are generated by division operations of dividing the twenty-fifth to thirty-second vector data V25 to V32 by the divisors D1, D2, and D3. The twenty-fifth vector residue number data RV25 may include first to third residue numbers RV25_1, RV25_2, and RV25_3. The twenty-sixth vector residue number data RV26 may include first to third residue numbers RV26_1, RV26_2, and RV26_3. The thirty-second vector residue number data RV32 may include first to third residue numbers RV32_1, RV32_2, and RV32_3.

The multiplication circuit 200 may perform fourth matrix multiplication on the twenty-fifth to thirty-second weight residue number data RW25 to RW32 and the twenty-fifth to thirty-second vector residue number data RV25 to RV32. The multiplication circuit 200 may generate twenty-fifth to thirty-second residue number multiplication data DRWV25, RRWV26 to DRWV32, that is, the results of the fourth matrix multiplication. The twenty-fifth residue number multiplication data DRWV25 may include first to third sub-residue number multiplication data DRWV25_1, DRWV25_2, and DRWV25_3. The twenty-sixth residue number multiplication data DRWV26 may include first to third sub-residue number multiplication data DRWV26_1, DRWV26_2, and DRWV26_3. The thirty-second residue number multiplication data DRWV32 may include first to third sub-residue number multiplication data DRWV32_1, DRWV32_2, and DRWV32_3. The addition circuit 300 may generate fourth residue number multiplication addition data DRMA4 by performing addition operations on the twenty-fifth to thirty-second residue number multiplication data DRWV25 to DRWV32. The fourth residue number multiplication addition data DRMA4 may include first sub-residue number multiplication addition data DRMA4_1, second sub-residue number multiplication addition data DRMA4_2, and third sub-residue number multiplication addition data DRMA4_3.

The accumulating circuit 400 may perform an accumulation operation of adding the fourth residue number multiplication addition data DRMA4 and latch data, that is, the third residue number accumulation data DRACC3. The accumulating circuit 400 may generate fourth residue number accumulation data DRACC4 through the accumulation operation. The fourth residue number accumulation data DRACC4 may include first sub-residue number accumulation data DRACC4_1, second sub-residue number accumulation data DRACC4_2, and third sub-residue number accumulation data DRACC4_3. As all of the first to fourth MAC operation are terminated, the MAC result read signal RD_RST having a logic high level HIGH may be transmitted to the accumulating circuit 400. The accumulating circuit 400 may output the fourth residue number accumulation data DRACC4 in response to the input of the MAC result read signal RD_RST having a logic high level HIGH. The fourth residue number accumulation data DRACC4 that is output by the accumulating circuit 400 may be transmitted to the MRC circuit 500.

The MRC circuit 500 may generate the fourth accumulation data DRACC4 by using the first, second, and third sub-residue number accumulation data DRACC4_1, DRACC4_2, and DRACC4_3 of the fourth residue number accumulation data DRACC4 and the first, second, and third divisors D1, D2, and D3 that have been used in the residue number generating circuit 100. The MRC circuit 500 may convert an unweighted number system, for example, a residue number system (RNS) into a weighted number system. The first, second, and third divisors D1, D2, and D3 may be set in the MRC circuit 500 as internal input data. The first, second, and third sub-residue number accumulation data DRACC4_1, DRACC4_2, and DRACC4_3 of the fourth residue number accumulation data DRACC4 that is input to the MRC circuit 500 corresponds to an RNS. The MRC circuit 500 may generate and output the number of weights that correspond to the first, second, and third sub-residue number accumulation data DRACC4_1, DRACC4_2, and DRACC4_3 of the fourth residue number accumulation data DRACC4. The number of weights that are generated by the MRC circuit 500 becomes the MAC result data RST1 of the result matrix 13, that is, a result of matrix multiplication for the weight matrix 11 and the vector matrix 12 in FIG. 1.

Figure 5:
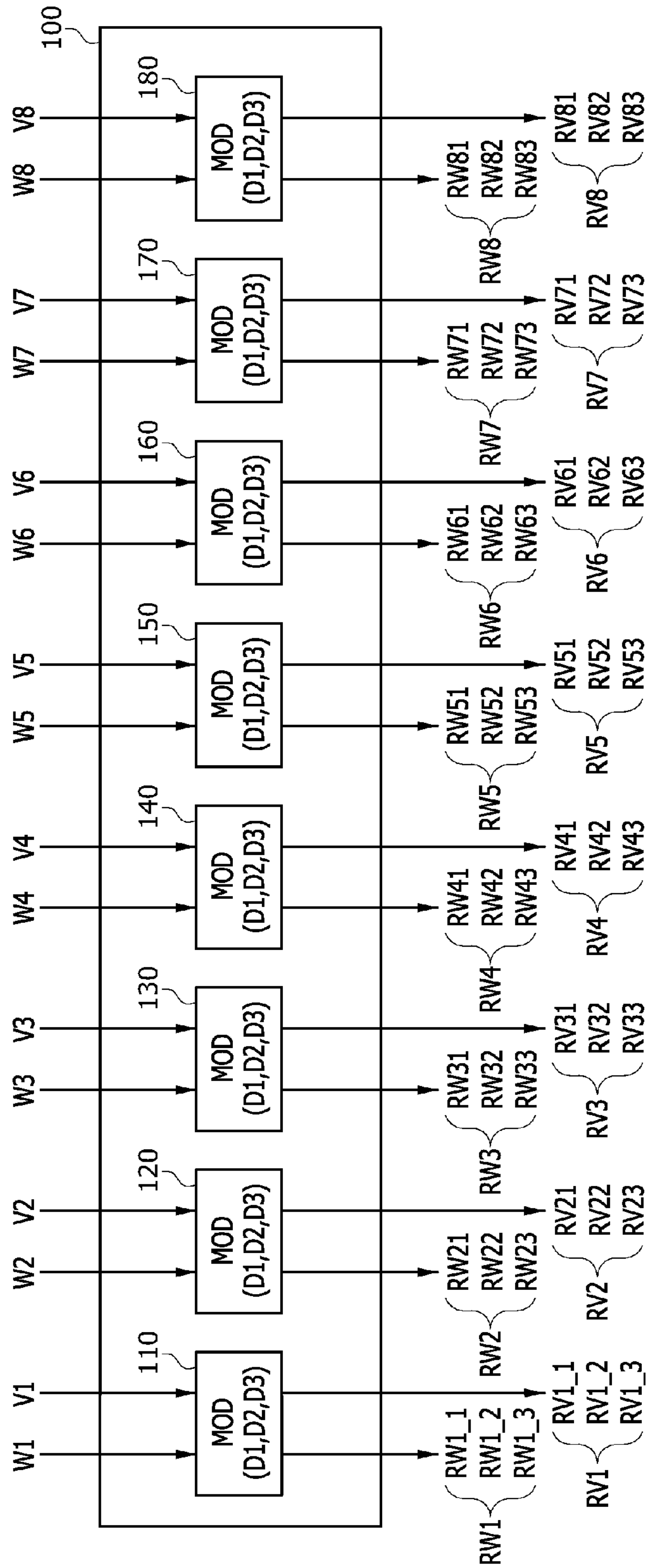
FIG. 5 is a block diagram illustrating an example of the residue number generating circuit that is included in the MAC operator of FIG. 2.

FIG. 5 is a block diagram illustrating an example of the residue number generating circuit 100 that is included in the MAC operator 10 of FIG. 2. Referring to FIG. 5, the residue number generating circuit 100 may include first to eighth modular operators 110 to 180. The first to eighth modular operators 110 to 180 may receive the first to eighth weight data W1 to W8 and the first to eighth vector data V1 to V8, respectively. For example, the first modular operator 110 may receive the first weight data W1 and the first vector data V1. The second modular operator 120 may receive the second weight data W2 and the second vector data V2. The third modular operator 120 may receive the third weight data W3 and the third vector data V3. Likewise, the eighth modular operator 180 may receive the eighth weight data W8 and the eighth vector data V8. Each of the first to eighth modular operators 110 to 180 may perform modular operations on weight data and vector data by using the first divisor D1, the second divisor D2, and the third divisor D3 as moduli. The first to eighth modular operators 110 to 180 may output the results of the modular operations as the first to eighth weight residue number data RW1 to RW8 and the first to eighth vector residue number data RV1 to RV8, respectively.

Specifically, the first modular operator 110 may output residue numbers of division operations of dividing the first weight data W1 by the first, second, and third divisors D1, D2, and D3 as the first to third residue numbers RW1_1, RW1_2, and RW1_3 (i.e., the first weight residue number data RW1). Furthermore, the first modular operator 110 may output residue numbers of division operations of dividing the first vector data V1 by the first, second, and third divisors D1, D2, and D3 as the first to third residue numbers RV1_1, RV1_2, and RV1_3 (i.e., the first vector residue number data RV1). The second modular operator 120 may output residue numbers of division operations of dividing the second weight data W2 by the first, second, and third divisors D1, D2, and D3 as the first to third residue numbers RW2_1, RW2_2, and RW2_3 (i.e., the second weight residue number data RW2). Furthermore, the first modular operator 110 may output residue numbers of division operations of dividing the second vector data V2 by the first, second, and third divisors D1, D2, and D3 as the first to third residue numbers RV2_1, RV2_2, and RV2_3 (i.e., the second vector residue number data RV2).

The third to eighth modular operators 130 to 180 may also perform modular operations in the same manner as that of the first and the second modular operators 110 and 120. Accordingly, the third to eighth modular operators 130 to 180 may output the first to third residue numbers RW3_1, RW3-2 to RW8_3 that constitute the weight residue number data RW3 to RW8 corresponding to the third to eighth modular operators, respectively, and the first to third residue numbers RV3_1, RV3_2 to RV8_3 that constitute the vector residue number data RV3 to RV8 corresponding to the third to eighth modular operators, respectively.

Figure 6:
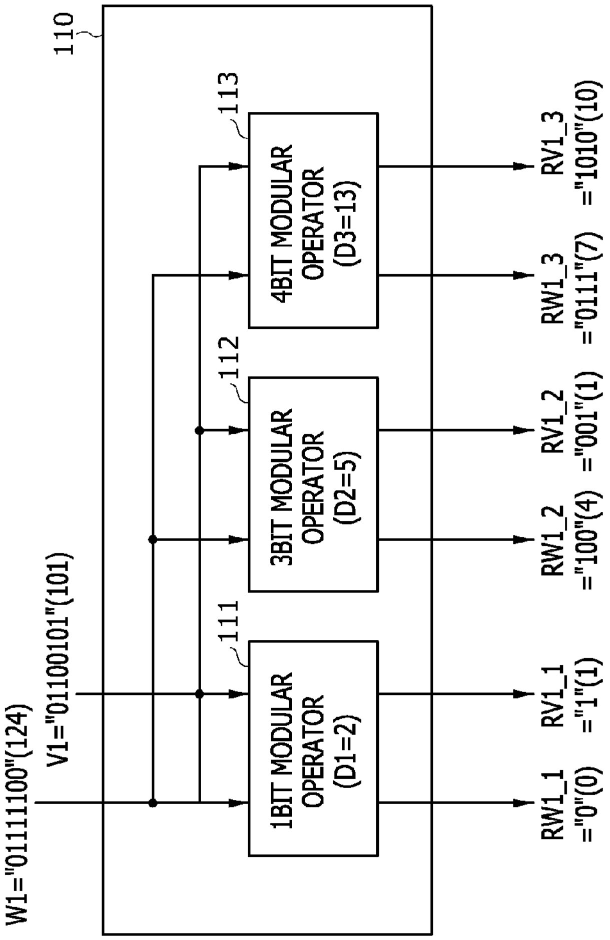
FIG. 6 is a diagram illustrated to describe an example of a construction of a first modular operator that is included in the residue number generating circuit of FIG. 5 and an example of an operation of a modular operation of the first modular operator.

FIG. 6 is a diagram illustrated to describe an example of a construction of the first modular operator 110 that is included in the residue number generating circuit 100 of FIG. 5 and an example of an operation of a modular operation of the first modular operator 110. The following description of the first modular operator 110 may also be identically applied to the second to eighth modular operators 120 to 180. In the present example, a case in which decimal numbers "2," "5", and "13" are used as the first, second, and third divisors D1, D2, and D3, respectively, is assumed. However, this is merely an embodiment and the present disclosure is not limited thereto. The first, second, and third divisors D1, D2, and D3 may be different in some embodiments.

Referring to FIG. 6, the first modular operator 110 may include the same number of sub-modular operators 111, 112, and 113 as the number of divisors. The sub-modular operators 111, 112, and 113 may generate residue numbers having different bits. In the present example, the sub-modular operators 111, 112, and 113 may include a 1-bit modular operator 111, a 3-bit modular operator 112, and the 4-bit modular operator 113. The 1-bit modular operator 111 may perform a modular operation using the first divisor D1, that is, the decimal number "2", as a modulus. A maximum value of each of the first residue numbers RW1_1 and RV1_1 that are generated by the 1-bit modular operator 111 becomes a positive integer, that is, a decimal number "1." Accordingly, each of the first residue numbers RW1_1 and RV1_1 that are generated by the 1-bit modular operator 111 may be represented as a 1-bit binary stream. The 3-bit modular operator 112 may perform a modular operation using the second divisor D2, that is, the decimal number "5", as a modulus. A maximum value of each of the second residue numbers RW1_2 and RV1_2 that are generated by the 3-bit modular operator 112 becomes a positive integer, that is, a decimal number "4." Accordingly, each of the second residue numbers RW1_2 and RV1_2 that are generated by the 3-bit modular operator 112 may be represented as a 3-bit binary stream. The 4-bit modular operator 113 may perform a modular operation using the third divisor D3, that is, the decimal number "13", as a modulus. A maximum value of each of the third residue numbers RW1_3 and RV1_3 that are generated by the 4-bit modular operator 113 becomes a positive integer, that is, the decimal number "12." Accordingly, each of the third residue numbers RW1_3 and RV1_3 that are generated by the 4-bit modular operator 113 may be represented as a 4-bit binary stream.

The 1-bit modular operator 111, the 3-bit modular operator 112, and the 4-bit modular operator 113 may receive the first weight data W1 and the first vector data V1 in common. Hereinafter, for convenience sake, a case in which the first weight data W1 and the first vector data V1 that are input to the first modular operator 110 are "01111100"(124) and "01100101"(101) is taken as an example. In this case, numbers in brackets may indicate decimal numbers, which may be identically applied hereinafter. Each of the first weight data W1 and the first vector data V1 consists of 8 bits. The most significant bit of the 8 bits is a sign bit. Accordingly, an operation for the first weight data W1 and the first vector data V1 may be performed on residue number 7 bits except the most significant bit. In the case of the present example, because the most significant bits of the first weight data W1 and the first vector data V1 are "0", the first weight data W1 and the first vector data V1 may have positive signs. The decimal numbers "2," "5", and "13", that is, the first, second, and third divisors D1, D2, and D3, may have a relation in which the decimal numbers are prime numbers and are relatively primes. Accordingly, the decimal numbers "2," "5", and "13", that is, the first, second, and third divisors D1, D2, and D3, satisfy the first condition among the two conditions that have been described with reference to FIG. 1. Each of the first weight data W1 and the first vector data V1 may have values within a "10000001"(−127) to "01111111"(+127) range. The product "2×5×13" of the first, second, and third divisors D1, D2, and D3 is a decimal number "130", and this value is greater than a maximum value of the first weight data W1 and the first vector data V1. Accordingly, "2," "5", and "13", that is, the first, second, and third divisors D1, D2, and D3, satisfy the second condition among the two conditions that have been described with reference to FIG. 1.

The 1-bit modular operator 111 of the first modular operator 110 may perform a modular operation, that is, "1111100" (124) mod "10"(2), on the first weight data W1 and the first divisor D1 and may output "0"(0), that is, the results of the modular operation, as the first residue number RW1_1 of the first weight residue number data RW1. Furthermore, the 1-bit modular operator 111 may perform a modular operation, that is, "1100101"(101) mod "10"(2), on the first vector data V1 and the first divisor D1, and may output "1"(1), that is, the results of the modular operation, as the first residue number RV1_1 of the first vector residue number data RV1. The 3-bit modular operator 112 of the first modular operator 110 may perform a modular operation, that is, "1111100"(124) mod "101"(5), on the first weight data W1 and the second divisor D2, and may output "100"(4), that is, the results of the modular operation, as the second residue number RW1_2 of the first weight residue number data RW1. Furthermore, the 3-bit modular operator 113 may perform a modular operation, that is, "1100101"(101) mod "101"(5), on the first vector data V1 and the second divisor D2, and may output "001"(1), that is, the results of the modular operation, as the second residue number RV1_2 of the first vector residue number data RV1. The 4-bit modular operator 113 of the first modular operator 110 may perform a modular operation, that is, "1111100"(124) mod "1101" (13), on the first weight data W1 and the third divisor D3, and may output "0111"(7), that is, the results of the modular operation, as the third residue number RW1_3 of the first weight residue number data RW1. Furthermore, the 4-bit modular operator 113 may perform a modular operation, that is, "1100101"(101) mod "1101"(13), on the first vector data V1 and the third divisor D3, and may output "1010"(10), that is, the results of the modular operation, as the second residue number RV1_2 of the first vector residue number data RV1.

As described above, the first weight data W1 having the 7 bits except the sign bit is changed into the first residue number RW1_1 having 1 bit, the second residue number RW1_2 having 3 bits, and the third residue number RW1_3 having 4 bits. Likewise, the first vector data V1 having the 7 bits except the sign bit is changed into the first residue number RV1_1 having 1 bit, the second residue number RV1_2 having 3 bits, and the third residue number RV1_3 having 4 bits. An operation for the first weight data W1 and the first vector data V1, for example, a multiplication operation may be performed in a (7-bit)×(7-bit) multiplier. In this case, if the circuit area of the (1 bit)×(1 bit) multiplier is assumed to be "1", the (7-bit)×(7-bit) multiplier may require a circuit area of "49." In contrast, a multiplication operation for the first residue numbers RW1_1 and RV1_1 may be performed in the (1 bit)×(1 bit) multiplier. A multiplication operation for the second residue numbers RW1_2 and RV1_2 may be performed in a (3 bits)×(3 bits) multiplier. Furthermore, a multiplication operation for the third residue numbers RW1_3 and RV1_3 may be performed in a (4 bits)×(4 bits) multiplier. If the circuit area of the (1 bit)×(1 bit) multiplier is assumed to be "1", the circuit areas of the (1 bit)×(1 bit) multiplier, the (3 bits)×(3 bits) multiplier, and the (4 bits)×(4 bits) multiplier are "1," "9," and "16", respectively. When all of the circuit areas "1," "9," and "16" are added, a circuit area of "26" may be required. In an embodiment, modular operators that constitute the residue number generating circuit 100 may be implemented as a sufficient small circuit area because the modular operators generate output data of 1 bit, 3 bits, and 4 bits, respectively.

Figure 7:
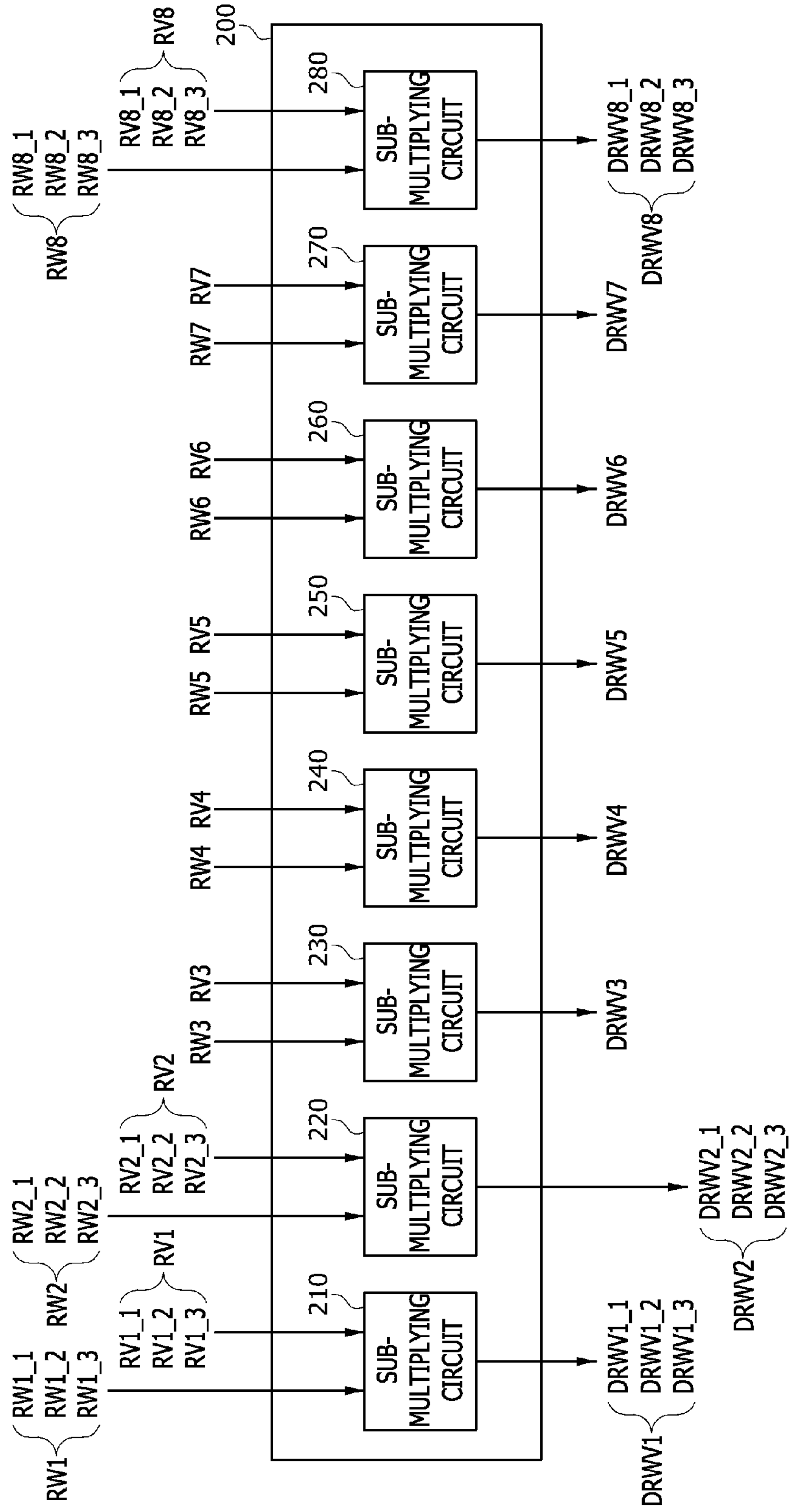
FIG. 7 is a block diagram illustrating an example of a multiplication circuit that is included in the MAC operator of FIG. 2.

FIG. 7 is a block diagram illustrating an example of the multiplication circuit 200 that is included in the MAC operator of FIG. 2. Referring to FIG. 7, the multiplication circuit 200 may include first to eighth sub-multiplying circuits 210 to 280. The first to eighth sub-multiplying circuits 210 to 280 may receive the first to eighth weight residue number data RW1 to RW8 and the first to eighth vector residue number data RV1 to RV8 corresponding to the sub-multiplying circuits, respectively. For example, the first sub-multiplying circuit 210 may receive the first, second, and third residue numbers RW1_1, RW1_2, and RW1_3 of the first weight residue number data RW1 and the first, second, and third residue numbers RV1_1, RV1_2, and RV1_3 of the first vector residue number data RV1. The second sub-multiplying circuit 220 may receive the first, second, and third residue numbers RW2_1, RW2_2, and RW2_3 of the second weight residue number data RW2 and the first, second, and third residue numbers RV2_1, RV2_2, and RV2_3 of the second vector residue number data RV2. In the same way, the eighth sub-multiplying circuit 280 may receive the first, second, and third residue numbers RW8_1, RW8_2, and RW8_3 of the eighth weight residue number data RW8 and the first, second, and third residue numbers RV8_1, RV8_2, and RV8_3 of the eighth vector residue number data RV8. Although omitted in this drawing, the third to seventh sub-multiplying circuits 230 to 270 may also receive the weight residue number data RW3 to RW7 and the vector residue number data RV3 to RV7, respectively, in the same manner.

Each of the first to eighth sub-multiplying circuits 210 to 280 may generate residue number multiplication data by performing a multiplication operation on the received weight residue number data and vector residue number data. The multiplication operation in each of the first to eighth sub-multiplying circuits 210 to 280 may be performed by being divided into a multiplication operation for a first residue number of weight residue number data and a first residue number of vector residue number data, a multiplication operation for a second residue number of weight residue number data and a second residue number of vector residue number data, and a multiplication operation for a third residue number of weight residue number data and a third residue number of vector residue number data.

Specifically, the first sub-multiplying circuit 210 may generate the first sub-residue number multiplication data DRWV1_1 of the first residue number multiplication data DRWV1 by performing a multiplication operation (i.e., RW1_1×RV1_1) on the first residue number RW1_1 of the first weight residue number data RW1 and the first residue number RV1_1 of the first vector residue number data RV1. The first sub-multiplying circuit 210 may generate the second sub-residue number multiplication data DRWV1_2 of the first residue number multiplication data DRWV1 by performing a multiplication operation (i.e., RW1_2×RV1_2) on the second residue number RW1_2 of the first weight residue number data RW1 and the second residue number RV1_2 of the first vector residue number data RV1. The first sub-multiplying circuit 210 may generate the third sub-residue number multiplication data DRWV1_3 of the first residue number multiplication data DRWV1 by performing a multiplication operation (i.e., RW1_3×RV1_3) on the third residue number RW1_3 of the first weight residue number data RW1 and the third residue number RV1_3 of the first vector residue number data RV1.

The second sub-multiplying circuit 220 may generate the first sub-residue number multiplication data DRWV2_1 of the second residue number multiplication data DRWV2 by performing a multiplication operation (i.e., RW2_1×RV2_1) on the first residue number RW2_1 of the second weight residue number data RW2 and the first residue number RV2_1 of the second vector residue number data RV2. The second sub-multiplying circuit 220 may generate the second sub-residue number multiplication data DRWV2_2 of the second residue number multiplication data DRWV2 by performing a multiplication operation (i.e., RW2_2×RV2_2) on the second residue number RW2_2 of the second weight residue number data RW2 and the second residue number RV2_2 of the second vector residue number data RV2. The second sub-multiplying circuit 220 may generate the third sub-residue number multiplication data DRWV2_3 of the second residue number multiplication data DRWV2 by performing a multiplication operation (i.e., RW2_3×RV2_3) on the third residue number RW2_3 of the second weight residue number data RW2 and the third residue number RV2_3 of the second vector residue number data RV2. In the same way, the eighth sub-multiplying circuit 280 may generate the first sub-residue number multiplication data DRWV8_1 of the eighth residue number multiplication data DRWV8 by performing a multiplication operation (i.e., RW8_1×RV8_1) on the first residue number RW8_1 of the eighth weight residue number data RW8 and the first residue number RV8_1 of the eighth vector residue number data RV8. The eighth sub-multiplying circuit 280 may generate the second sub-residue number multiplication data DRWV8_2 of the eighth residue number multiplication data DRWV8 by performing a multiplication operation (i.e., RW8_2×RV8_2) on the second residue number RW8_2 of the eighth weight residue number data RW8 and the second residue number RV8_2 of the eighth vector residue number data RV8. The eighth sub-multiplying circuit 280 may generate the third sub-residue number multiplication data DRWV8_3 of the eighth residue number multiplication data DRWV8 by performing a multiplication operation (i.e., RW8_3×RV8_3) on the third residue number RW8_3 of the eighth weight residue number data RW8 and the third residue number RV8_3 of the eighth vector residue number data RV8. The third to seventh sub-multiplying circuits 230 to 270 may also generate the third to seventh residue number multiplication data DRWV3 to DRWV7, respectively, by performing multiplication operations using the same method.

Figure 8:
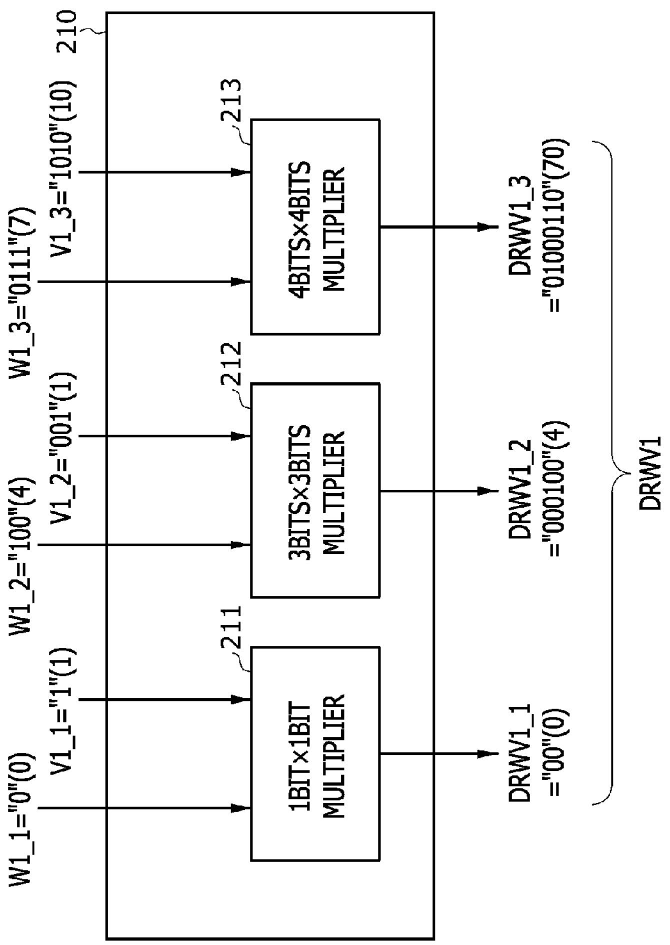
FIG. 8 is a diagram illustrated to describe an example of a construction of a first sub-multiplying circuit that is included in the multiplication circuit of FIG. 7 and an example of an operation of a multiplication operation of the first sub-multiplying circuit.

FIG. 8 is a diagram illustrated to describe an example of a construction of the first sub-multiplying circuit 210 that is included in the multiplication circuit 200 of FIG. 7 and an example of an operation of a multiplication operation of the first sub-multiplying circuit 210. The following description of the first sub-multiplying circuit 210 may be applied to the second to eighth sub-multiplying circuits 220-280 in the same manner. Referring to FIG. 8, the first sub-multiplying circuit 210 may include a (1 bit)×(1 bit) multiplier 211, a (3 bits)×(3 bits) multiplier 212, and a (4 bits)×(4 bits) multiplier 213. The (1 bit)×(1 bit) multiplier 211 may receive "0"(0), that is, the first residue number RW1_1 of the first weight residue number data RW1, and "1"(1), that is, the first residue number RV1_1 of the first vector residue number data RV1, from the first modular operator (110 in FIG. 5) of the residue number generating circuit (100 in FIGS. 2 and 5). The (1 bit)×(1 bit) multiplier 211 may perform a multiplication operation on "0"(0) and "1"(1), that is, the first residue numbers RW1_1 and RV1_1. The (1 bit)×(1 bit) multiplier 211 may output "00"(0), that is, the results of the multiplication operation, as the first sub-residue number multiplication data DRWV1_1 of the first residue number multiplication data DRWV1. The first sub-residue number multiplication data DRWV1_1 of the first residue number multiplication data DRWV1 may have (1 bit)+(1 bit), that is, a 2-bit size. The (3 bits)×(3 bits) multiplier 212 may receive "100"(4), that is, the second residue number RW1_2 of the first weight residue number data RW1, and "001"(1), that is, the second residue number RV1_2 of the first vector residue number data RV1, from the first modular operator (110 in FIG. 5) of the residue number generating circuit (100 in FIGS. 2 and 5). The (3 bits)×(3 bits) multiplier 212 may perform a multiplication operation on "100"(4) and "001"(1), that is, the second residue numbers RW1_2 and RV1_2. The (3 bits)×(3 bits) multiplier 212 may output "000100"(4), that is, the results of the multiplication operation, as the second sub-residue number multiplication data DRWV1_2 of the first residue number multiplication data DRWV1. The second sub-residue number multiplication data DRWV1_2 of the first residue number multiplication data DRWV1 may have (3 bits)+(3 bits), that is, a 6-bit size. The (4 bits)×(4 bits) multiplier 213 may receive "0111"(7), that is, the third residue number RW1_3 of the first weight residue number data RW1, and "1010"(10), that is, the third residue number RV1_3 of the first vector residue number data RV1, from the first modular operator (110 in FIG. 5) of the residue number generating circuit (100 in FIGS. 2 and 5). The (4 bits)×(4 bits) multiplier 213 may perform a multiplication operation on "0111"(7) and "1010"(10), that is, the third residue numbers RW1_3 and RV1_3. The (4 bits)×(4 bits) multiplier 213 may output "01000110"(70), that is, the results of the multiplication operation, as the third sub-residue number multiplication data DRWV1_3 of the first residue number multiplication data DRWV1. The third sub-residue number multiplication data DRWV1_3 of the first residue number multiplication data DRWV1 may have (4 bits)+(4 bits), that is, an 8-bit size.

Figure 9:
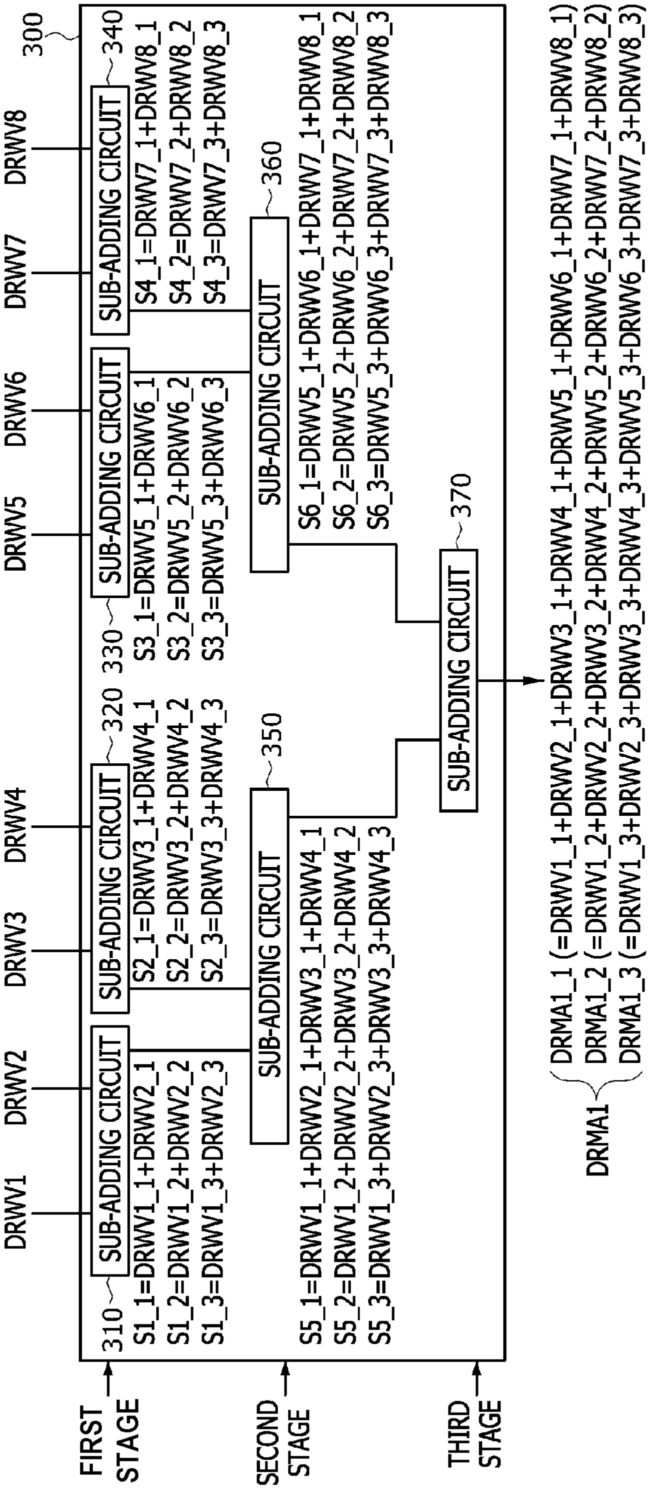
FIG. 9 is a block diagram illustrating an example of an addition circuit that is included in the MAC operator of FIG. 2.

FIG. 9 is a block diagram illustrating an example of the addition circuit 300 that is included in the MAC operator 10 of FIG. 2. Referring to FIG. 9, the addition circuit 300 may have a plurality of sub-adding circuits 310 to 370 disposed as a hierarchical structure, such as a tree. The first to fourth sub-adding circuits 310 to 340 may be disposed in a first stage of the addition circuit 300. The fifth sub-adding circuit 350 and the sixth sub-adding circuit 360 may be disposed in a second stage of the addition circuit 300. The seventh sub-adding circuit 370 may be disposed in a third stage of the addition circuit 300.

The first sub-adding circuit 310 of the first stage may receive the first and second residue number multiplication data DRWV1 and DRWV2 from the first and second sub-multiplying circuits (210 and 220 in FIG. 7) of the multiplication circuit (200 in FIG. 7). The first sub-adding circuit 310 may generate first residue number addition data S1_1, S1_2, and S1_3 by performing an addition operation on the first and second residue number multiplication data DRWV1 and DRWV2. The first residue number addition data S1_1 may be the results of an addition operation, that is, "DRWV1_1+DRWV2_1", on the first sub-residue number multiplication data DRWV1_1 of the first residue number multiplication data DRWV1 and the first sub-residue number multiplication data DRWV2_1 of the second residue number multiplication data DRWV2. The first residue number addition data S1_2 may be the results of an addition operation, that is, "DRWV1_2+DRWV2_2", on the second sub-residue number multiplication data DRWV1_2 of the first residue number multiplication data DRWV1 and the second sub-residue number multiplication data DRWV2_2 of the second residue number multiplication data DRWV2. The first residue number addition data S1_3 may be the results of an addition operation, that is, "DRWV1_3+DRWV2_3", on the third sub-residue number multiplication data DRWV1_3 of the first residue number multiplication data DRWV1 and the third sub-residue number multiplication data DRWV2_3 of the second residue number multiplication data DRWV2.

The second sub-adding circuit 320 of the first stage may receive the third and fourth residue number multiplication data DRWV3 and DRWV4 from the third and fourth sub-multiplying circuits (230 and 240 in FIG. 7) of the multiplication circuit (200 in FIG. 7). The second sub-adding circuit 320 may generate second residue number addition data S2_1, S2_2, and S2_3 by performing an addition operation on the third and fourth residue number multiplication data DRWV3 and DRWV4. The second residue number addition data S2_1 may be the results of an addition operation, that is, "DRWV3_1+DRWV4_1", on the first sub-residue number multiplication data DRWV3_1 of the third residue number multiplication data DRWV3 and the first sub-residue number multiplication data DRWV4_1 of the fourth residue number multiplication data DRWV4. The second residue number addition data S2_2 may be the results of an addition operation, that is, "DRWV3_2+DRWV4_2", on the second sub-residue number multiplication data DRWV3_2 of the third residue number multiplication data DRWV3 and the second sub-residue number multiplication data DRWV4_2 of the fourth residue number multiplication data DRWV4. The second residue number addition data S2_3 may be the results of an addition operation, that is, "DRWV3_3+DRWV4_3", on the third sub-residue number multiplication data DRWV3_3 of the third residue number multiplication data DRWV3 and the third sub-residue number multiplication data DRWV4_3 of the fourth residue number multiplication data DRWV4.

The third sub-adding circuit 330 of the first stage may receive the fifth and sixth residue number multiplication data DRWV5 and DRWV6 from the fifth and sixth sub-multiplying circuits (250 and 260 in FIG. 7) of the multiplication circuit (200 in FIG. 7). The third sub-adding circuit 330 may generate third residue number addition data S3_1, S3_2, and S3_3 by performing an addition operation on the fifth and sixth residue number multiplication data DRWV5 and DRWV6. The third residue number addition data S3_1 may be the results of an addition operation, that is, "DRWV5_1+DRWV6_1", on the first sub-residue number multiplication data DRWV5_1 of the fifth residue number multiplication data DRWV5 and the first sub-residue number multiplication data DRWV6_1 of the sixth residue number multiplication data DRWV6. The third residue number addition data S3_2 may be the results of an addition operation, that is, "DRWV5_2+DRWV6_2", on the second sub-residue number multiplication data DRWV5_2 of the fifth residue number multiplication data DRWV5 and the second sub-residue number multiplication data DRWV6_2 of the sixth residue number multiplication data DRWV6. The third residue number addition data S3_3 may be the results of an addition operation, that is, "DRWV5_3+DRWV6_3", on the third sub-residue number multiplication data DRWV5_3 of the fifth residue number multiplication data DRWV5 and the third sub-residue number multiplication data DRWV6_3 of the sixth residue number multiplication data DRWV6.

The fourth sub-adding circuit 340 of the first stage may receive the seventh and eighth residue number multiplication data DRWV7 and DRWV8 from the seventh and eighth sub-multiplying circuits (270 and 280 in FIG. 7) of the multiplication circuit (200 in FIG. 7). The fourth sub-adding circuit 340 may generate fourth residue number addition data S4_1, S4_2, and S4_3 by performing an addition operation on the seventh and eighth residue number multiplication data DRWV7 and DRWV8. The fourth residue number addition data S4_1 may be the results of an addition operation, that is, "DRWV7_1+DRWV8_1", on the first sub-residue number multiplication data DRWV7_1 of the seventh residue number multiplication data DRWV7 and the first sub-residue number multiplication data DRWV8_1 of the eighth residue number multiplication data DRWV8. The fourth residue number addition data S4_2 may be the results of an addition operation, that is, "DRWV7_2+DRWV8_2", on the second sub-residue number multiplication data DRWV7_2 of the seventh residue number multiplication data DRWV7 and the second sub-residue number multiplication data DRWV8_2 of the eighth residue number multiplication data DRWV8. The fourth residue number addition data S4_3 may be the results of an addition operation, that is, "DRWV7_3+DRWV8_3", on the third sub-residue number multiplication data DRWV7_3 of the seventh residue number multiplication data DRWV7 and the third sub-residue number multiplication data DRWV8_3 of the eighth residue number multiplication data DRWV8.

The fifth sub-adding circuit 350 of the second stage may receive the first residue number addition data S1_1, S1_2, and S1_3 from the first sub-adding circuit 310 of the first stage, and may receive the second residue number addition data S2_1, S2_2, and S2_3 from the second sub-adding circuit 320. The fifth sub-adding circuit 350 may generate fifth residue number addition data S5_1, S5_2, and S5_3 by performing an addition operation on the first residue number addition data S1_1, S1_2, and S1_3 and the second residue number addition data S2_1, S2_2, and S2_3. The fifth residue number addition data S5_1 may be the results of an addition operation for the first residue number addition data S1_1 and the second residue number addition data S2_1, that is, an operation for "DRWV1_1+DRWV2_1+DRWV3_1+DRWV4_1." The fifth residue number addition data S5_2 may be the results of an addition operation for the first residue number addition data S1_2 and the second residue number addition data S2_2, that is, "DRWV1_2+DRWV2_2+DRWV3_2+DRWV4_2." Furthermore, the fifth residue number addition data S5_3 may be the results of an addition operation for the first residue number addition data S1_3 and the second residue number addition data S2_3, that is, "DRWV1_3+DRWV2_3+DRWV3_3+DRWV4_3."

The sixth sub-adding circuit 360 of the second stage may receive the third residue number addition data S3_1, S3_2, and S3_3 from the third sub-adding circuit 330 of the first stage, and may receive the fourth residue number addition data S4_1, S4_2, and S4_3 from the fourth sub-adding circuit 340. The sixth sub-adding circuit 360 may generate sixth residue number addition data S6_1, S6_2, and S6_3 by performing an addition operation on the third residue number addition data S3_1, S3_2, and S3_3 and the fourth residue number addition data S4_1, S4_2, and S4_3. The sixth residue number addition data S6_1 may be the results of an operation for an addition operation, that is, "DRWV5_1+DRWV6_1+DRWV7_1+DRWV8_1", for the third residue number addition data S3_1 and the fourth residue number addition data S4_1. The sixth residue number addition data S6_2 may be the results of an addition operation, that is, "DRWV5_2+DRWV6_2+DRWV7_2+DRWV8_2", for the third residue number addition data S3_2 and the fourth residue number addition data S4_2. Furthermore, the sixth residue number addition data S6_3 may be the results of an addition operation, that is, "DRWV5_3+DRWV6_3+DRWV7_3+DRWV8_3", for the third residue number addition data S3_3 and the fourth residue number addition data S4_3.

The seventh sub-adding circuit 370 of the third stage may receive the fifth residue number addition data S5_1, S5_2, and S5_3 from the fifth sub-adding circuit 350 of the second stage and the sixth residue number addition data S6_1, S6_2, and S6_3 from the sixth sub-adding circuit 360 of the second stage. The seventh sub-adding circuit 370 may generate the first, second, and third sub-residue number multiplication addition data DRMA1_1, DRMA1_2, and DRMA1_3 of the first residue number multiplication addition data DRMA1 by performing an addition operation on the fifth residue number addition data S5_1, S5_2, and S5_3 and the sixth residue number addition data S6_1, S6_2, and S6_3. The first sub-residue number multiplication addition data DRMA1_1 of the first residue number multiplication addition data DRMA1 may be the results of an addition operation, that is, "DRWV1_1+DRWV2_1+DRWV3_1+DRWV4_1+DRWV5_1+DRWV6_1+DRWV7_1+DRWV8_1", for the fifth residue number addition data S5_1 and the sixth residue number addition data S6_1. The second sub-residue number multiplication addition data DRMA1_2 of the first residue number multiplication addition data DRMA1 may be the results of an addition operation, that is, "DRWV1_2+DRWV2_2+DRWV3_2+DRWV4_2+DRWV5_2+DRWV6_2+DRWV7_2+DRWV8_2", for the fifth residue number addition data S5_2 and the sixth residue number addition data S6_2. Furthermore, the third sub-residue number multiplication addition data DRMA1_3 of the first residue number multiplication addition data DRMA1 may be the results of the addition operation, that is, "DRWV1_3+DRWV2_3+DRWV3_3+DRWV4_3+DRWV5_3+DRWV6_3+DR WV7_3+DRWV8_3", for the fifth residue number addition data S5_3 and the sixth residue number addition data S6_3.

Figure 10:
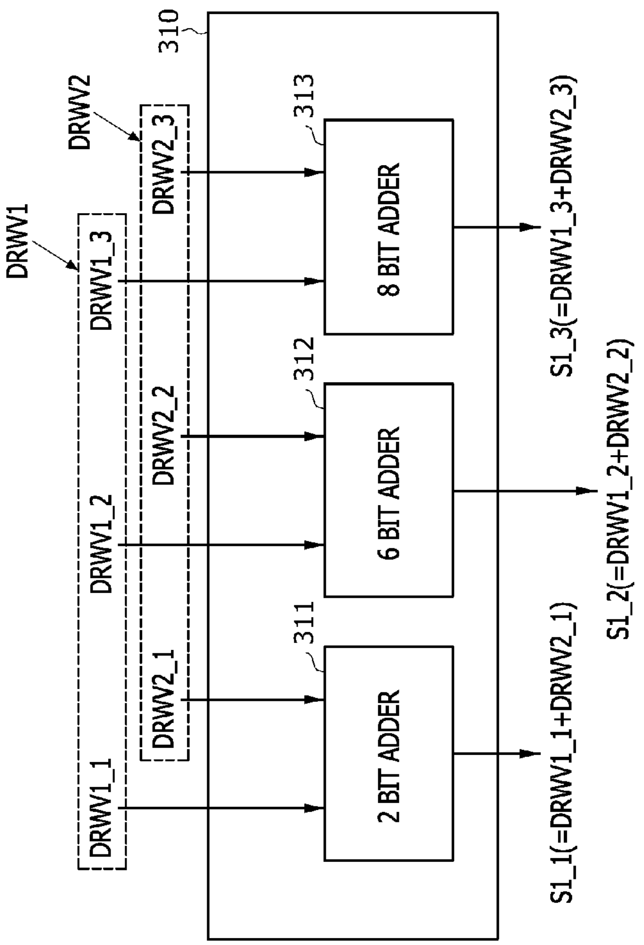
FIG. 10 is a block diagram illustrating an example of a first sub-adding circuit that is included in the addition circuit of FIG. 9.

FIG. 10 is a block diagram illustrating an example of the first sub-adding circuit 310 that is included in the addition circuit 300 of FIG. 9. The following description of the first sub-adding circuit 310 may be applied to the second to seventh sub-adding circuits 320 to 370 of the addition circuit 300 of FIG. 9 in the same manner. Referring to FIG. 10, the first sub-adding circuit 310 may include a 2-bit adder 311, a 6-bit adder 312, and an 8-bit adder 313. The 2-bit adder 311 may receive the first sub-residue number multiplication data DRWV1_1 of the first residue number multiplication data DRWV1 from the (1 bit)×(1 bit) multiplier (211 in FIG. 8) of the first sub-multiplying circuit (210 in FIGS. 7 and 8). Furthermore, the 2-bit adder 311 may receive the first sub-residue number multiplication data DRWV2_1 of the second residue number multiplication data DRWV2 from the (1 bit)×(1 bit) multiplier of the second sub-multiplying circuit (220 in FIG. 7). The 2-bit adder 311 may perform an addition operation on the first sub-residue number multiplication data DRWV1_1 and DRWV2_1, and may output result data (i.e., DRWV1_1+DRWV2_1) thereof as the first residue number addition data S1_1.

The 6-bit adder 312 may receive the second sub-residue number multiplication data DRWV1_2 of the first residue number multiplication data DRWV1 from the (3 bits)×(3 bits) multiplier (212 in FIG. 8) of the first sub-multiplying circuit (210 in FIGS. 7 and 8). Furthermore, the 6-bit adder 312 may receive the second sub-residue number multiplication data DRWV2_2 of the second residue number multiplication data DRWV2 from the (3 bits)×(3 bits) multiplier of the second sub-multiplying circuit (220 in FIG. 7). The 6-bit adder 312 may perform an addition operation on the second sub-residue number multiplication data DRWV1_2 and DRWV2_2, and may output result data (i.e., DRWV1_2+DRWV2_2) thereof as the second first residue number addition data S1_2. The 8-bit adder 313 may receive the third sub-residue number multiplication data DRWV1_3 of the first residue number multiplication data DRWV1 from the (4 bits)×(4 bits) multiplier (213 in FIG. 8) of the first sub-multiplying circuit (210 in FIGS. 7 and 8). Furthermore, the 8-bit adder 313 may receive the third sub-residue number multiplication data DRWV2_3 of the second residue number multiplication data DRWV2 from the (4 bits)×(4 bits) multiplier of the second sub-multiplying circuit (220 in FIG. 7). The 8-bit adder 313 may perform an addition operation on the third sub-residue number multiplication data DRWV1_3 and DRWV2_3, and may output result data (i.e., DRWV1_3+DRWV2_3) thereof as the third first residue number addition data S1_2.

Seven 14-bit adders that constitute the existing addition circuit may be replaced with sub-adding circuits of the addition circuit 300 according to the present example, that is, the 2-bit adder, the 6-bit adder, and the 8-bit adder. If the circuit area of a (1 bit)×(1 bit) adder is assumed to be "1", the 14-bit adder may require a circuit area of "56" because the 14-bit adder has 14 bits in width and 4 bits in height. In this case, the height bits of the 14-bit adder are set according to a rule of "height bit≥log 2 (width bit)." In contrast, the 2-bit adder may require a circuit area of "2" because the 2-bit adder has 2 bits in width and 1 bit in height. The 6-bit adder may require a circuit area of "18" because the 6-bit adder has 6 bits in width and 3 bits in height. Furthermore, the 8-bit adder may require a circuit area of "24" because the 8-bit adder has 8 bits in width and 3 bits in height. Accordingly, each of sub-adding circuits 310 to 370 of the addition circuit 300 according to the present example may require a circuit area of "2+18+24=44." In the case of the present example, because the number of sub-adding circuits 310 to 370 that constitute the addition circuit 300 is seven, the addition circuit 300 may require a circuit area of "44×7=308." In contrast, if an addition circuit is constituted with seven 14-bit adders, a circuit area of "56×7=392" may be required. Accordingly, the circuit area may be reduced by "392 to 308." However, this is merely an embodiment and the present disclosure is not limited thereto. A degree of a circuit area that is reduced due to the number of sub-adding circuits constituting the addition circuit 300, a divisor that is used as a modulus, etc. may be different. For example, a circuit area that is reduced is further increased as the number of sub-adding circuits constituting the addition circuit 300 is increased.

Figure 11:
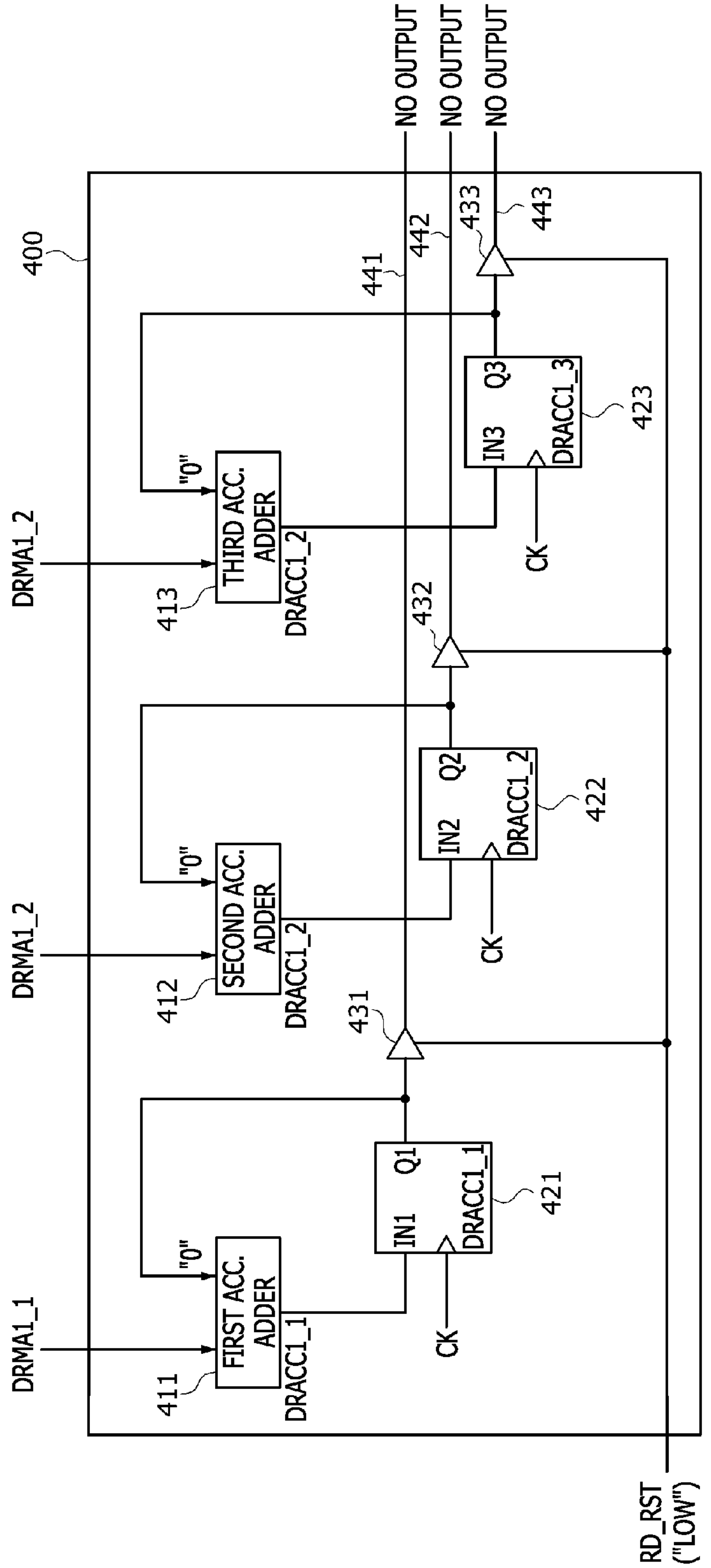
FIG. 11 is a diagram illustrating an example of an accumulating circuit that is included in the MAC operator of FIG. 2.

FIG. 11 is a diagram illustrating an example of the accumulating circuit 400 that is included in the MAC operator 10 of FIG. 2. Referring to FIG. 11, the accumulating circuit 400 may include three adders 411 to 413, three latch circuits 421 to 423, and three output buffers 431 to 433. In the present example, the accumulating circuit 400 includes the three output buffers 431 to 433. In another example, however, the three output buffers 431 to 433 may constitute a separate output circuit. The three adders may include a first acc. adder 411, a second acc. adder 412, and a third acc. adder 413.

Each of the first, second, and third acc. adders 411, 412, and 413 may have a first input terminal, a second input terminal, and an output terminal. The first acc. adder 411 may receive the first sub-residue number multiplication addition data DRMA1_1 of the first residue number multiplication addition data DRMA1 from the addition circuit (300 in FIG. 2) through the first input terminal thereof. The output terminal of the first acc. adder 411 may be connected to an input terminal IN1 of the first latch circuit 421. An output terminal Q1 of the first latch circuit 421 may be connected to the second input terminal of the first acc. adder 411. Furthermore, the output terminal Q1 of the first latch circuit 421 may also be connected to an input terminal of the first output buffer 431. The first latch circuit 421 may receive a clock signal CK through a clock terminal thereof. The first latch circuit 421 may perform a latch operation and an output operation in synchronization with the clock signal CK.

The second acc. adder 412 may receive the second sub-residue number multiplication addition data DRMA1_2 of the first residue number multiplication addition data DRMA1 from the addition circuit (300 in FIG. 2) through the first input terminal thereof. The output terminal of the second acc. adder 412 may be connected to an input terminal IN2 of the second latch circuit 422. An output terminal Q2 of the second latch circuit 422 may be connected to the second input terminal of the second acc. adder 412. Furthermore, the output terminal Q2 of the second latch circuit 422 may also be connected to an input terminal of the second output buffer 432. The second latch circuit 422 may receive the clock signal CK through a clock terminal thereof. The second latch circuit 422 may perform a latch operation and an output operation in synchronization with the clock signal CK.

The third acc. adder 413 may receive the third sub-residue number multiplication addition data DRMA1_3 of the first residue number multiplication addition data DRMA1 from the addition circuit (300 in FIG. 2) through the first input terminal thereof. The output terminal of the third acc. adder 413 may be connected to an input terminal IN3 of the third latch circuit 423. An output terminal Q3 of the third latch circuit 423 may be connected to the second input terminal of the third acc. adder 413. Furthermore, the output terminal Q3 of the third latch circuit 423 may also be connected to an input terminal of the third output buffer 433. The third latch circuit 423 may receive the clock signal CK through a clock terminal thereof. The third latch circuit 423 may perform a latch operation and an output operation in synchronization with the clock signal CK.

The first output buffer 431 may receive the MAC result read signal RD_RST through an enable terminal thereof. An output terminal of the first output buffer 431 may be connected to a first output line 441 of the accumulating circuit 400. When the MAC result read signal RD_RST having a logic low level, for example, is transmitted to the enable terminal of the first output buffer 431, the first output buffer 431 might not output data that is transmitted by the first latch circuit 421. In contrast, when the MAC result read signal RD_RST having a logic high level is transmitted to the enable terminal of the first output buffer 431, the first output buffer 431 may output, to the first output line 441, data that is transmitted by the first latch circuit 421. The second output buffer 432 may receive the MAC result read signal RD_RST through an enable terminal thereof. An output terminal of the second output buffer 432 may be connected to a second output line 442 of the accumulating circuit 400. When the MAC result read signal RD_RST having a logic low level, for example, is transmitted to the enable terminal of the second output buffer 432, the second output buffer 432 might not output data that is transmitted by the second latch circuit 422. In contrast, when the MAC result read signal RD_RST having a logic high level is transmitted to the enable terminal of the second output buffer 432, the second output buffer 432 may output, to the second output line 442, data that is transmitted by the second latch circuit 422. An output terminal of the third output buffer 433 may be connected to a third output line 443 of the accumulating circuit 400. When the MAC result read signal RD_RST having a logic low level, for example, is transmitted to an enable terminal of the third output buffer 433, the third output buffer 433 might not output data that is transmitted by the third latch circuit 423. In contrast, when the MAC result read signal RD_RST having a logic high level is transmitted to the enable terminal of the third output buffer 433, the third output buffer 433 may output, to the third output line 443, data that is transmitted by the third latch circuit 423.

The first acc. adder 411 may perform an accumulation operation on the first sub-residue number multiplication addition data DRMA1_1 of the first residue number multiplication addition data DRMA1 from the addition circuit (300 in FIG. 2) and latch data that is transmitted by the first latch circuit 421. As in the present example, in the case of the first MAC operation among four MAC operations, the latch data that is transmitted by the first latch circuit 421 is "0." Accordingly, the first acc. adder 411 may output the same first sub-residue number accumulation data DRACC1_1 as the first sub-residue number multiplication addition data DRMA1_1. The first latch circuit 421 may latch the first sub-residue number accumulation data DRACC1_1 that is output by the first acc. adder 411. The first sub-residue number accumulation data DRACC1_1 that is latched in the first latch circuit 421 may be transmitted to the first acc. adder 411 as first latch data in a next MAC operation, that is, the second MAC operation. Furthermore, the first sub-residue number accumulation data DRACC1_1 that is latched in the first latch circuit 421 may also be transmitted to the input terminal of the first output buffer 431. Because all of the MAC operations are not completed, the MAC result read signal RD_RST having a logic low level LOW may be transmitted to the enable terminal of the first output buffer 431. Accordingly, the first output buffer 431 might not output the first sub-residue number accumulation data DRACC1_1.

The second acc. adder 412 may perform an accumulation operation on the second sub-residue number multiplication addition data DRMA1_2 of the first residue number multiplication addition data DRMA1 from the addition circuit (300 in FIG. 2) and latch data that is transmitted by the second latch circuit 422. Because the latch data that is transmitted by the second latch circuit 422 is "0", the second acc. adder 412 may output the same second sub-residue number accumulation data DRACC1_2 as the second sub-residue number multiplication addition data DRMA1_2. The second latch circuit 422 may latch the second sub-residue number accumulation data DRACC1_2 that is output by the second acc. adder 412. The second sub-residue number accumulation data DRACC1_2 that is latched in the second latch circuit 422 may be transmitted to the second acc. adder 412 as first latch data in a next MAC operation, that is, the second MAC operation. Furthermore, the second sub-residue number accumulation data DRACC1_2 that is latched in the second latch circuit 422 may also be transmitted to the input terminal of the second output buffer 432. Because all of the MAC operations are not completed, the MAC result read signal RD_RST having a logic low level LOW may be transmitted to the enable terminal of the second output buffer 432. Accordingly, the second output buffer 432 might not output the second sub-residue number accumulation data DRACC1_2.

The third acc. adder 413 may perform an accumulation operation on the third sub-residue number multiplication addition data DRMA1_3 of the first residue number multiplication addition data DRMA1 from the addition circuit (300 in FIG. 2) and latch data that is transmitted by the third latch circuit 423. Because the latch data that is transmitted by the third latch circuit 423 is "0", the third acc. adder 413 may output the same third sub-residue number accumulation data DRACC1_3 as the third sub-residue number multiplication addition data DRMA1_3. The third latch circuit 423 may latch the third sub-residue number accumulation data DRACC1_3 that is output by the third acc. adder 413. The third sub-residue number accumulation data DRACC1_3 that is latched in the third latch circuit 423 may be transmitted to the third acc. adder 413 as first latch data in a next MAC operation, that is, the second MAC operation. Furthermore, the third sub-residue number accumulation data DRACC1_3 that is latched in the third latch circuit 423 may also be transmitted to the input terminal of the third output buffer 433. Because all of the MAC operations are not completed, the MAC result read signal RD_RST having a logic low level LOW may be transmitted to the enable terminal of the third output buffer 433. Accordingly, the third output buffer 433 might not output the second sub-residue number accumulation data DRACC1_2.

Figure 12:
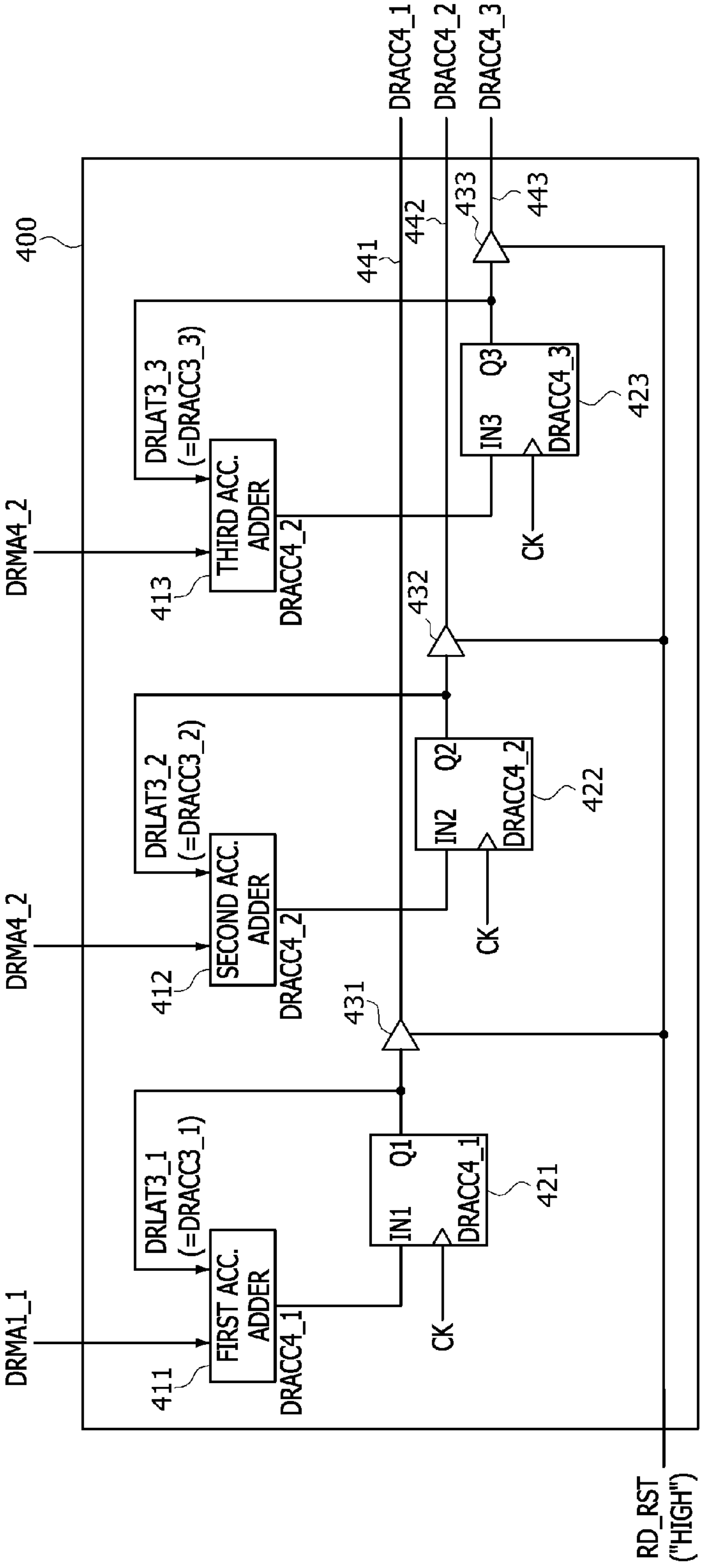
FIG. 12 is a diagram illustrating an operation of the accumulating circuit in an operation of a fourth MAC operation among operations of first to fourth MAC operations that are performed by the MAC operator of FIG. 2.

FIG. 12 is a diagram illustrating an operation of the accumulating circuit 400 in an operation of a fourth MAC operation among operations of first to fourth MAC operations that are performed by the MAC operator 10 of FIG. 2. In FIG. 12, the same reference numeral as that in FIG. 11 may indicate the same component. In the present example, as described with reference to FIG. 4, it is assumed that the MAC operator 10 transmits the first, second, and third sub-residue number multiplication addition data DRMA4_1, DRMA4_2, and DRMA4_3 of the fourth residue number multiplication addition data DRMA4 from the addition circuit (300 in FIG. 2) to the accumulating circuit 400 by performing a multiplication operation and addition operation of the fourth MAC operation. Referring to FIG. 12, the first acc. adder 411 may receive the first sub-residue number multiplication addition data DRMA4_1 of the fourth residue number multiplication addition data DRMA4 and third residue number latch data DRLAT3_1. The third residue number latch data DRLAT3_1 may be the first sub-residue number accumulation data DRACC3_1 of the third residue number accumulation data DRACC3 that is latched in the first latch circuit 421 in a previous third MAC operation. The first acc. adder 411 may perform an accumulation operation on the first sub-residue number multiplication addition data DRMA4_1 of the fourth residue number multiplication addition data DRMA4 and the third residue number latch data DRLAT3_1. The first acc. adder 411 may output the first sub-residue number accumulation data DRACC4_1 of the fourth residue number accumulation data DRACC4, that is, the results of the accumulation operation. The first latch circuit 421 may latch the first sub-residue number accumulation data DRACC4_1 that is output by the first acc. adder 411. The first sub-residue number accumulation data DRACC4_1 that is latched in the first latch circuit 421 may be transmitted to the input terminal of the first output buffer 431.

The second acc. adder 412 may receive the second sub-residue number multiplication addition data DRMA4_2 of the fourth residue number multiplication addition data DRMA4 and third residue number latch data DRLAT3_2. The third residue number latch data DRLAT3_2 may be the second sub-residue number accumulation data DRACC3_2 of the third residue number accumulation data DRACC3 that is latched in the second latch circuit 422 in a previous third MAC operation. The second acc. adder 412 may perform an accumulation operation on the second sub-residue number multiplication addition data DRMA4_2 of the fourth residue number multiplication addition data DRMA4 and the third residue number latch data DRLAT3_2. The second acc. adder 412 may output the second sub-residue number accumulation data DRACC4_2 of the fourth residue number accumulation data DRACC4, that is, the results of the accumulation operation. The second latch circuit 422 may latch the second sub-residue number accumulation data DRACC4_2 that is output by the second acc. adder 412. The second sub-residue number accumulation data DRACC4_2 that is latched in the second latch circuit 422 may be transmitted to the input terminal of the second output buffer 432.

The third acc. adder 413 may receive the third sub-residue number multiplication addition data DRMA4_3 of the fourth residue number multiplication addition data DRMA4 and third residue number latch data DRLAT3_3. The third residue number latch data DRLAT3_3 may be the third sub-residue number accumulation data DRACC3_3 of the third residue number accumulation data DRACC3 that is latched in the second latch circuit 422 in a previous third MAC operation. The third acc. adder 413 may perform an accumulation operation on the third sub-residue number multiplication addition data DRMA4_3 of the fourth residue number multiplication addition data DRMA4 and the third residue number latch data DRLAT3_3. The third acc. adder 413 may output the third sub-residue number accumulation data DRACC4_3 of the fourth residue number accumulation data DRACC4, that is, the results of the accumulation operation. The third latch circuit 423 may latch the third sub-residue number accumulation data DRACC4_3 that is output by the third acc. adder 413. The third sub-residue number accumulation data DRACC4_3 that is latched in the third latch circuit 423 may be transmitted to the input terminal of the third output buffer 433.

Each of the first, second, and third output buffers 431, 432, and 433 may receive the MAC result read signal RD_RST having a logic high level HIGH through the enable terminal thereof. The first output buffer 431 may output, through the first output line 441, the first sub-residue number accumulation data DRACC4_1 of the fourth residue number accumulation data DRACC4 that is transmitted by the first latch circuit 421, in response to the MAC result read signal RD_RST having a logic high level HIGH. The second output buffer 432 may output, through the second output line 442, the second sub-residue number accumulation data DRACC4_2 of the fourth residue number accumulation data DRACC4 that is transmitted by the second latch circuit 422, in response to the MAC result read signal RD_RST having a logic high level HIGH. The third output buffer 433 may output, through the third output line 443, the third sub-residue number accumulation data DRACC4_3 of the fourth residue number accumulation data DRACC4 that is transmitted by the third latch circuit 423, in response to the MAC result read signal RD_RST having a logic high level HIGH. The first, second, and third sub-residue number accumulation data DRACC4_1, DRACC4_2, and DRACC4_3 of the fourth residue number accumulation data DRACC4 may be transmitted to the MRC circuit (500 in FIG. 2).

Figure 13:
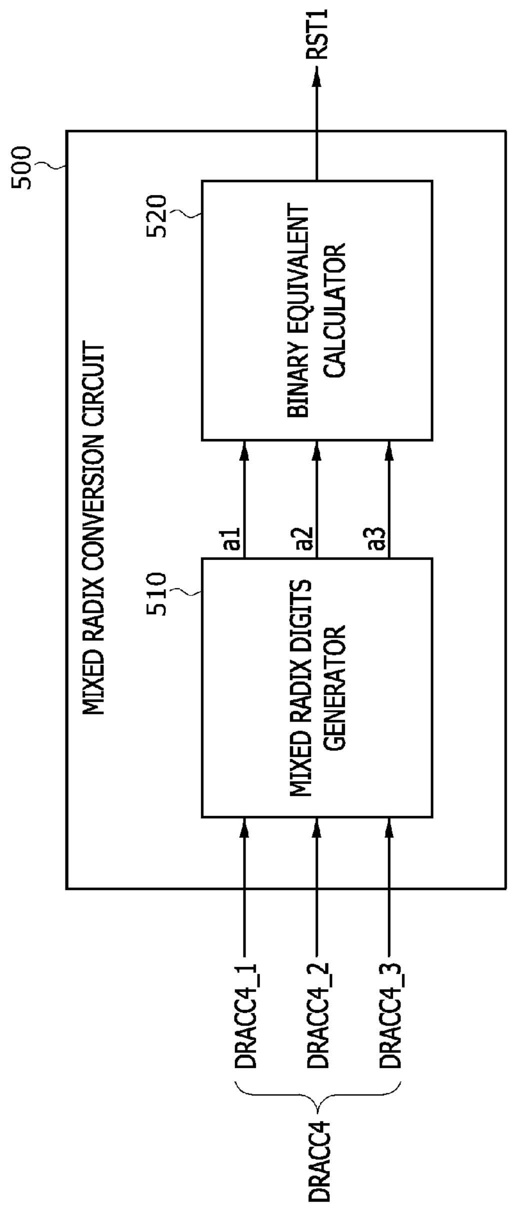
FIG. 13 is a block diagram illustrating an example of a mixed radix conversion (MRC) circuit that is included in the MAC operator of FIG. 2.
Figure 14:
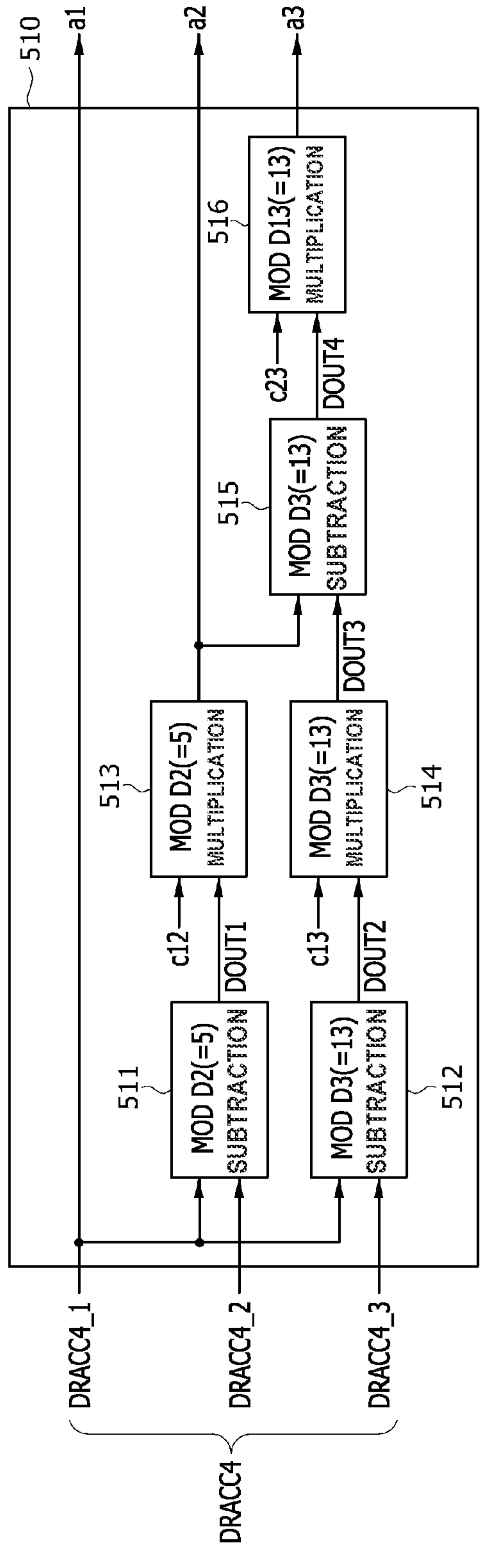
FIG. 14 is a block diagram illustrating an example of a construction of a mixed radix digits generator that is included in the MRC circuit of FIG. 13.

FIG. 13 is a block diagram illustrating an example of the MRC circuit 500 that is included in the MAC operator 10 of FIG. 2. Furthermore, FIG. 14 is a block diagram illustrating an example of a construction of a mixed radix digits generator 510 of FIG. 13. Referring first to FIG. 13, the MRC circuit 500 may include the mixed radix digits generator 510 and a binary equivalent calculator 520. Although omitted in this drawing, the first, second, and third divisors D1, D2, and D3 that are used in the residue number generating circuit (100 in FIG. 2) are input to the mixed radix digits generator 510 and the binary equivalent calculator 520. The mixed radix digits generator 510 may receive the first, second, and third sub-residue number accumulation data DRACC4_1, DRACC4_2, and DRACC4_3 of the fourth residue number accumulation data DRACC4 from the accumulating circuit (400 in FIG. 12). The mixed radix digits generator 510 may generate first, second, and third mixed radix digits a1, a2, and a3 by using the first, second, and third divisors D1, D2, and D3 and the first, second, and third sub-residue number accumulation data DRACC4_1, DRACC4_2, and DRACC4_3. The mixed radix digits generator 510 may output the generated first, second, and third mixed radix digits a1, a2, and a3.

As illustrated in FIG. 14, the mixed radix digits generator 510 may include a plurality of operators, for example, first to sixth operators 511 to 516. The first, second, and fifth operators 511, 512, and 515 may perform modular operations and subtraction operations. The third, fourth, and sixth operators 513, 514, and 516 may perform modular operations and multiplication operations.

Specifically, the first sub-residue number accumulation data DRACC4_1 of the fourth residue number accumulation data DRACC4 that is input to the mixed radix digits generator 510 is output from the mixed radix digits generator 510 as the first mixed radix digit a1. The second sub-residue number accumulation data DRACC4_2 of the fourth residue number accumulation data DRACC4 may be input to the first operator 511 along with the first sub-residue number accumulation data DRACC4_1. Furthermore, the third sub-residue number accumulation data DRACC4_3 of the fourth residue number accumulation data DRACC4 may be input to the third operator 513 along with the first sub-residue number accumulation data DRACC4_1.

The first operator 511 may perform a subtraction operation of subtracting the first sub-residue number accumulation data DRACC4_1 from the second sub-residue number accumulation data DRACC4_2. Furthermore, the first operator 511 may perform a modular operation using the second divisor D2, that is, the decimal number "5", on result data that is generated by the subtraction operation. The first operator 511 may output the results of the modular operation as first output data DOUT1. Because the first sub-residue number accumulation data DRACC4_1 constitutes the first mixed radix digit a1, the first operator 511 may perform the subtraction operation and modular operation of "$<(\mathrm{DRACC4\_2}-\mathrm{a1})>_5$". In this case, "$< >_5$" may mean the modular operation using "5" as a divisor. The second operator 512 may perform a subtraction operation of subtracting the first sub-residue number accumulation data DRACC4_1 from the third sub-residue number accumulation data DRACC4_3. Furthermore, the second operator 512 may perform a modular operation using the third divisor D3, that is, the decimal number "13", on result data that is generated by the subtraction operation. The second operator 512 may output the results of the modular operation as the second output data DOUT2. Because the first sub-residue number accumulation data DRACC4_1 constitutes the first mixed radix digit a1, the second operator 512 may perform the subtraction operation and modular operation of "$<(\mathrm{DRACC4\_32}-\mathrm{a1})>_{13}$". In this case, "$< >_{13}$" may mean the modular operation using "13" as a divisor.

The third operator 513 may receive a first multiplicative inverse c12 and the first output data DOUT1 of the first operator 511. The first multiplicative inverse c12 may indicate a multiplicative inverse of the results of a modular operation in which a dividend is D1 (i.e., "2") and a divisor is D2 (i.e., "5"). Accordingly, a relation equation of "$<\mathrm{c12}\times\mathrm{D1}>_{D2}=1$" may be established. The third operator 513 may perform a multiplication operation on the first multiplicative inverse c12 and the first output data DOUT1 of the first operator 511. The third operator 513 may perform a modular operation using the second divisor D2, that is, the decimal number "5", on the results of the multiplication operation. That is, the third operator 513 may perform the multiplication operation and modular operation of "$<(\mathrm{DOUT1}\times\mathrm{c12})>_5$", and may output the results of the multiplication operation and modular operation as the second mixed radix digit a2.

The fourth operator 514 may receive a second multiplicative inverse c13 and the second output data DOUT2 of the second operator 512. The second multiplicative inverse c13 may indicate a multiplicative inverse of the results of a modular operation in which a dividend is D1 (i.e., "2") and a divisor is D3 (i.e., "13"). Accordingly, a relation equation of "$<\mathrm{c13}\times\mathrm{D1}>_{D3}=1$" may be established. The fourth operator 514 may perform a multiplication operation on the second multiplicative inverse c13 and the second output data DOUT2 of the second operator 512. The fourth operator 514 may perform a modular operation using the third divisor D3, that is, the decimal number "13", on the results of the multiplication operation. That is, the fourth operator 514 may perform the multiplication operation and modular operation of "$<(\mathrm{DOUT2}\times\mathrm{c13})>_{13}$", and may output the results of the multiplication operation and modular operation as the third output data DOUT3.

The fifth operator 515 may receive output data of the third operator 513, that is, the second mixed radix digit a2, and the third output data DOUT3 of the fourth operator 514. The fifth operator 515 may perform a subtraction operation of subtracting the second mixed radix digit a2 from the third output data DOUT3. The fifth operator 515 may perform a modular operation using the third divisor D3, that is, the decimal number "13", on the results of the subtraction operation. That is, the fifth operator 515 may perform the subtraction operation and modular operation of "$<(\mathrm{DOUT3}-\mathrm{a2})>_{13}$", and may output the results of the subtraction operation and modular operation as the fourth output data DOUT4.

The sixth operator 516 may receive a third multiplicative inverse c23 and the fourth output data DOUT4 of the fifth operator 515. The third multiplicative inverse c23 may indicate a multiplicative inverse of the results of a modular operation in which a dividend is D2 (i.e., "5") and a divisor is D3 (i.e., "13"). Accordingly, a relation equation of "$<\mathrm{c23}\times\mathrm{D2}>_{D3}=1$" may be established. The sixth operator 516 may perform a multiplication operation on the third multiplicative inverse c23 and the fourth output data DOUT4. The sixth operator 516 may perform a modular operation using the third divisor D3, that is, the decimal number "13", on the results of the multiplication operation. That is, the sixth operator 516 may perform the multiplication operation and modular operation of "$<(\mathrm{DOUT4}\times\mathrm{c23})>_{13}$", and may output the results of the multiplication operation and modular operation as the third mixed radix digit a3.

Referring back to FIG. 13, the first, second, and third mixed radix digits a1, a2, and a3 that are generated by the mixed radix digits generator 510 may be input to the binary equivalent calculator 520. The binary equivalent calculator 520 may calculate a binary equivalent by using the first, second, and third divisors D1, D2, and D3 and the first, second, and third mixed radix digits a1, a2, and a3, and may output the results of the calculation as the first MAC result data RST1. The binary equivalent, that is, the first MAC result data RST1, may be obtained by Equation (7).

$$\mathrm{RST1}=a1+a2\times D1+a3\times D1\times D2 \quad \text{Equation (7)}$$

A limited number of possible embodiments for the present teachings have been presented above for illustrative purposes. Those of ordinary skill in the art will appreciate that various modifications, additions, and substitutions are possible. While this patent document contains many specifics, these should not be construed as limitations on the scope of the present teachings or of what may be claimed, but rather as descriptions of features that may be specific to particular embodiments. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A multiplication and accumulation (MAC) operator for generating MAC result data by performing an MAC operation on first to "M"-th weight data and first to "M"-th vector data, the MAC operator comprising:

a residue number generating circuit configured to generate first to "M"-th weight residue number data for first to the "M"-th weight data and first to "M"-th vector residue number data for the first to "M"-th vector data by using first to "K"-th divisors;

a multiplication circuit configured to generate first to "M"-th residue number multiplication data by performing a multiplication operation on the first to "M"-th weight residue number data and the first to "M"-th vector residue number data;

an addition circuit configured to generate residue number multiplication addition data by performing an addition operation on the first to "M"-th residue number multiplication data;

an accumulating circuit configured to generate residue number accumulation data by performing an accumulation operation on the residue number multiplication addition data and latch data; and a mixed radix conversion circuit configured to generate the MAC result data by using the first to "K"-th divisors and the residue number accumulation data that is transmitted by the accumulating circuit to the mixed radix conversion circuit, wherein "M" is a natural number, and wherein "K" is a natural number equal to or greater than 2.

2. The MAC operator of claim 1, wherein all of the first to "K"-th divisors have a relation in which the divisors are prime numbers and are relatively primes.

3. The MAC operator of claim 2, wherein the first to "K"-th divisors are set such that a value obtained by multiplying all of the first to "K"-th divisors is greater than a maximum value of each of the first to "M"-th weight data and the first to "M"-th vector data, which are used as dividends.

4. The MAC operator of claim 1, wherein:

each of the first to "M"-th weight residue number data comprises first to "K"-th weight residue numbers, and each of the first to "M"-th vector residue number data comprises first to "K"-th vector residue numbers.

5. The MAC operator of claim 4, wherein:

the residue number generating circuit comprises first to "M"-th modular operators, each of the first to "M"-th modular operators comprises first to "K"-th sub-modular operators, and the first to "K"-th sub-modular operators are configured to generate the first to "K"-th weight residue numbers and the first to "K"-th vector residue numbers having different bits.

6. The MAC operator of claim 5, wherein the first to "K"-th sub-modular operators of an "I"-th modular operator, among the first to "M"-th modular operators, are configured to receive "I"-th weight data and "I"-th vector data in common and configured to generate the first to "K"-th weight residue numbers for the "I"-th weight data and the first to "K"-th vector residue numbers for the "I"-th vector data, wherein a "J"-th sub-modular operator, among the first to "K"-th sub-modular operators, is configured to output a "J"-th weight residue number, among the first to "K"-th weight residue numbers for the "I"-th weight data, by performing a modular operation using a "J"-th divisor on the "I"-th weight data and configured to output a "J"-th vector residue number, among the first to "K"-th vector residue numbers for the "I"-th vector data, by performing a modular operation using the "J"-th divisor on the "I"-th vector data wherein "I" is a natural number between 1 and "M", and wherein "J" is a natural number between 1 and "K".

7. The MAC operator of claim 1, wherein:

the residue number generating circuit is configured to generate first to "K"-th weight residue numbers of each of the first to "M"-th weight residue number data and first to "K"-th vector residue numbers of each of the first to "M"-th vector residue number data, and the multiplication circuit is configured to generate first to "K"-th sub-residue number multiplication data of each of the first to "M"-th residue number multiplication data.

8. The MAC operator of claim 7, wherein:

the multiplication circuit comprises first to "M"-th sub-multiplying circuits, each of the first to "M"-th sub-multiplying circuits comprises first to "K"-th multipliers, and the first to "K"-th multipliers are configured to generate the first to "K"-th sub-residue number multiplication data having different bits, respectively.

9. The MAC operator of claim 8, wherein the first to "K"-th multipliers that constitute an "I"-th sub-multiplying circuit, among the first to "M"-th sub-multiplying circuits, are configured to receive the first to "K"-th weight residue numbers for "I"-th weight data and the first to "K"-th vector residue numbers for "I"-th vector data, and wherein a "J"-th multiplier, among the first to "K"-th multipliers, is configured to generate "J"-th sub-residue number multiplication data, among the first to "K"-th sub-residue number multiplication data, by performing a multiplication operation on a "J"-th weight residue number, among the first to "K"-th weight residue numbers, and a "J"-th vector residue number among the first to "K"-th vector residue numbers, wherein "I" is a natural number between 1 and "M", and wherein "J" is a natural number between 1 and "K".

10. The MAC operator of claim 1, wherein:

each of the first to "M"-th residue number multiplication data that are generated by the multiplication circuit comprises first to "K"-th sub-residue number multiplication data, the addition circuit comprises first to "(M−1)" sub-adding circuits that are configured in an adder tree form, and each of the first to "M"-th sub-adding circuits comprises first to "K"-th adders configured to generate addition data having different bits.

11. The MAC operator of claim 10, wherein:

("M"/2) sub-adding circuits are disposed in a first stage having the adder tree, and sub-adding circuits that are ½ of sub-adding circuits of a higher stage are disposed from a second stage of the adder tree to a last stage of the adder tree.

12. The MAC operator of claim 11, wherein the sub-adding circuits of the first stage are configured to generate first to ("M"/2)-th residue number addition data, wherein each of the first to ("M"/2)-th residue number addition data comprises first to "K"-th sub-residue number addition data, and wherein each of the sub-adding circuits of the first stage is configured to:

receive "L"-th residue number multiplication data and "(L+1)"-th residue number multiplication data, among the first to "M"-th residue number multiplication data, and generate "J"-th sub-residue number addition data, among the first to "K"-th sub-residue number addition data, by performing an addition operation on "J"-th sub-residue number multiplication data, among the first to "K"-th sub-residue number multiplication data of the "L"-th residue number multiplication data, and "J"-th sub-residue number multiplication data, among the first to "K"-th sub-residue number multiplication data of the "(L+1)"-th residue number multiplication data, wherein "L" is an odd number between 1 and "M−1", and wherein "J" is a natural number between 1 and "K".

13. The MAC operator of claim 12, wherein:

the sub-adding circuit of the last stage is configured to receive first and second residue number addition data from each of two sub-adding circuits of a previous stage and configured to generate the residue number multiplication addition data through an addition operation for the first and second residue number addition data, and the residue number multiplication addition data comprises first to "K"-th sub-residue number multiplication addition data.

14. The MAC operator of claim 1, wherein:

the residue number multiplication addition data that is generated by the addition circuit comprises first to "K"-th sub-residue number multiplication addition data, and the accumulating circuit comprises:

first to "K"-th acc. adders configured to receive first to "K"-th sub-residue number multiplication addition data and first to "K"-th latch data and configured to generate the residue number accumulation data that is constituted with first to "K"-th sub-residue number accumulation data; and the first to "K"-th latch circuits configured to latch the first to "K"-th residue number accumulation data that are output by the first to "K"-th acc. adders.

15. The MAC operator of claim 14, wherein a "J"-th acc. adder among the first to "K"-th acc. adders is configured to generate "J"-th residue number accumulation data, among the first to "K"-th residue number accumulation data, by performing an accumulation addition operation on "J"-th sub-residue number multiplication addition data, among the first to "K"-th sub-residue number multiplication addition data, and "J"-th latch data that is fed back by a "J"-th latch circuit, among the first to "K"-th latch circuits, and wherein "J" is a natural number between 1 and "K".

16. The MAC operator of claim 15, wherein a "J"-th latch circuit among the first to "K"-th latch circuits is configured to latch and output the "J"-th residue number accumulation data that is output by the "J"-th acc. adder.

17. The MAC operator of claim 14, wherein the accumulating circuit further comprises first to "K"-th output buffers configured to output, to an outside of the MAC operator, the first to "K"-th residue number accumulation data that are output by the first to "K"-th latch circuits.

18. The MAC operator of claim 17, wherein the first to "K"-th output buffers are configured to:

not output the first to "K"-th residue number accumulation data when an MAC result read signal that is transmitted to an enable terminal of each of the output buffers has a first logic level, and output the first to "K"-th residue number accumulation data when the MAC result read signal has a second logic level.

19. The MAC operator of claim 1, wherein:

the accumulating circuit is configured to generate the residue number accumulation data that is constituted with first to "K"-th sub-residue number accumulation data, and the mixed radix conversion circuit comprises:

a mixed radix digits generator configured to operate first to "K"-th mixed radix digits by using the first to "K"-th sub-residue number accumulation data and the first to "K"-th divisors; and a binary equivalent calculator configured to operate the MAC result data by using the first to "K"-th mixed radix digits and the first to "K"-th divisors.

20. The MAC operator of claim 19, wherein the mixed radix digits generator comprises a plurality of operators configured to operate the first to "K"-th mixed radix digits by performing a subtraction operation or a multiplication operation and performing a modular operation using any one of the first to "K"-th divisors on results of the subtraction operation or the multiplication operation.

* * * * *